(12) United States Patent
Mori

(10) Patent No.: US 10,832,104 B2
(45) Date of Patent: Nov. 10, 2020

(54) IMAGE PROCESSING APPARATUS THAT CONVERTS IMAGE DATA FROM LINE SEQUENCE TO BLOCK SEQUENCE, IMAGE PROCESSING METHOD, AND STORAGE MEDIUM

(71) Applicant: CANON KABUSHIKI KAISHA, Tokyo (JP)

(72) Inventor: Hiroshi Mori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/216,524

(22) Filed: Dec. 11, 2018

(65) Prior Publication Data
US 2019/0108426 A1 Apr. 11, 2019

Related U.S. Application Data

(63) Continuation of application No. 15/354,648, filed on Nov. 17, 2016, now Pat. No. 10,185,902.

(30) Foreign Application Priority Data

Nov. 19, 2015 (JP) .................... 2015-226939

(51) Int. Cl.
*G06K 15/02* (2006.01)
*H04N 1/00* (2006.01)

(52) U.S. Cl.
CPC ..... *G06K 15/1823* (2013.01); *G06K 15/1813* (2013.01); *G06K 15/1817* (2013.01); *G06K 15/1863* (2013.01); *H04N 1/00204* (2013.01); *H04N 1/00307* (2013.01); *H04N 1/00344* (2013.01); *H04N 2201/0094* (2013.01)

(58) Field of Classification Search
None
See application file for complete search history.

(56) References Cited

U.S. PATENT DOCUMENTS

| 8,274,667 B2* | 9/2012 | Kitora | H04N 1/40062 358/1.13 |
| 8,294,912 B2* | 10/2012 | Matsui | H04N 1/46 358/1.1 |
| 8,508,775 B2* | 8/2013 | Saisho | H04N 1/41 358/1.15 |

(Continued)

FOREIGN PATENT DOCUMENTS

| JP | 2009-269355 A | 11/2009 |
| JP | 2014-000753 A | 1/2014 |

*Primary Examiner* — Thomas D Lee
(74) *Attorney, Agent, or Firm* — Canon U.S.A., Inc. IP Division

(57) ABSTRACT

An apparatus that performs image processing on input image data in parallel in units of block according to an aspect of the invention includes a derivation unit configured to derive a memory size used in conversion processing of converting data alignment sequence in the image data from a line sequence into a block sequence which is executed before rendering of the image data and a memory size used in the conversion processing which is executed after the rendering of the image data, a determination unit configured to determine a timing for executing the conversion processing based on the derivation results, and a conversion unit configured to execute the conversion processing at the determined timing.

12 Claims, 21 Drawing Sheets

(56) References Cited

U.S. PATENT DOCUMENTS

2012/0086970 A1* 4/2012 Takahashi .......... G06K 15/1859
                                                    358/1.13
2014/0071463 A1* 3/2014 Achiwa .............. G06K 15/1861
                                                    358/1.5

* cited by examiner

| REGION | BLOCK SEQUENCE CONVERSION METHOD |
|---|---|
| BAND REGION #1 ($0 \leq Y \leq 31$) | VECTOR SYSTEM |
| BAND REGION #2 ($32 \leq Y \leq 63$) | VECTOR SYSTEM |
| BAND REGION #3 ($64 \leq Y \leq 95$) | RASTER SYSTEM |
| ...... | |
| BAND REGION #N ($6944 \leq Y \leq 6968$) | RASTER SYSTEM |

FIG. 9A

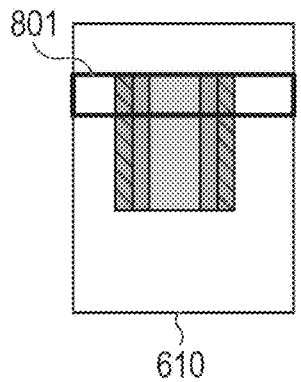

| LINE START DATA | CLOSED REGION #1 DATA || CLOSED REGION #2 DATA || OBJECT #1 DATA |
|---|---|---|---|---|---|
| | LENGTH INFO | 1000 PIXELS | LENGTH INFO | 300 PIXELS | |
| | OBJECT NO. | 0 PIECES | OBJECT NO. | 1 PIECE | |
| CLOSED REGION #3 DATA || OBJECT #2 DATA | CLOSED REGION #4 DATA || OBJECT #3 DATA |
| LENGTH INFO | 300 PIXELS | | LENGTH INFO | 1000 PIXELS | |
| OBJECT NO. | 1 PIECE | | OBJECT NO. | 1 PIECE | |
| CLOSED REGION #5 DATA || OBJECT #2 DATA | CLOSED REGION #6 DATA || OBJECT #1 DATA |
| LENGTH INFO | 300 PIXELS | | LENGTH INFO | 300 PIXELS | |
| OBJECT NO. | 1 PIECE | | OBJECT NO. | 1 PIECE | |
| CLOSED REGION #7 DATA || (REPETITION FOR NUMBER OF LINES IN PROCESSING BAND) || LINE START DATA |
| LENGTH INFO | 1760 PIXELS | | |
| OBJECT NO. | 0 PIECES | | |
| CLOSED REGION #1 DATA || CLOSED REGION #2 DATA | OBJECT #1 DATA | CLOSED REGION #3 DATA ||
| LENGTH INFO | 1000 PIXELS | LENGTH INFO | 300 PIXELS | | LENGTH INFO | 300 PIXELS |
| OBJECT NO. | 0 PIECES | OBJECT NO. | 1 PIECE | | OBJECT NO. | 1 PIECE |
| OBJECT #2 DATA | CLOSED REGION #4 DATA || OBJECT #3 DATA | CLOSED REGION #5 DATA ||
| | LENGTH INFO | 1000 PIXELS | | LENGTH INFO | 300 PIXELS |
| | OBJECT NO. | 1 PIECE | | OBJECT NO. | 1 PIECE |
| OBJECT #2 DATA | CLOSED REGION #6 DATA || OBJECT #1 DATA | CLOSED REGION #7 DATA ||
| | LENGTH INFO | 300 PIXELS | | LENGTH INFO | 1760 PIXELS |
| | OBJECT NO. | 1 PIECE | | OBJECT NO. | 0 PIECE |

DATA SEQUENCE →

FIG. 10B

| LINE START DATA (INITIAL POSITION OF BLOCK 808) | CLOSED REGION #1 DATA | | CLOSED REGION #2 DATA | | OBJECT #1 DATA |
|---|---|---|---|---|---|
| | LENGTH INFO | 1000 PIXELS | LENGTH INFO | 300 PIXELS | |
| | OBJECT NO. | 0 PIECES | OBJECT NO. | 1 PIECE | |
| CLOSED REGION #3 DATA | | OBJECT #2 DATA | CLOSED REGION #4 DATA | | OBJECT #3 DATA |
| LENGTH INFO | 300 PIXELS | | LENGTH INFO | 880 PIXELS | |
| OBJECT NO. | 1 PIECE | | OBJECT NO. | 1 PIECE | |

...... (REPETITION FOR NUMBER OF LINES IN BLOCK)

| LINE START DATA | CLOSED REGION #1 DATA | | CLOSED REGION #2 DATA | | OBJECT #1 DATA |
|---|---|---|---|---|---|
| | LENGTH INFO | 1000 PIXELS | LENGTH INFO | 300 PIXELS | |
| | OBJECT NO. | 0 PIECES | OBJECT NO. | 1 PIECE | |
| CLOSED REGION #3 DATA | | OBJECT #2 DATA | CLOSED REGION #4 DATA | | OBJECT #3 DATA |
| LENGTH INFO | 300 PIXELS | | LENGTH INFO | 880 PIXELS | |
| OBJECT NO. | 1 PIECE | | OBJECT NO. | 1 PIECE | |

| LINE START DATA (INITIAL POSITION OF BLOCK 809) | CLOSED REGION #4 DATA | | OBJECT #3 DATA | CLOSED REGION #5 DATA | |
|---|---|---|---|---|---|
| | LENGTH INFO | 120 PIXELS | | LENGTH INFO | 300 PIXELS |
| | OBJECT NO. | 1 PIECE | | OBJECT NO. | 1 PIECE |
| OBJECT #2 DATA | CLOSED REGION #6 DATA | | OBJECT #1 DATA | CLOSED REGION #7 DATA | |
| | LENGTH INFO | 300 PIXELS | | LENGTH INFO | 1760 PIXELS |
| | OBJECT NO. | 1 PIECE | | OBJECT NO. | 0 PIECES |

...... (REPETITION FOR NUMBER OF LINES IN BLOCK)

| LINE START DATA | CLOSED REGION #4 DATA | | OBJECT #3 DATA | CLOSED REGION #5 DATA | |
|---|---|---|---|---|---|
| | LENGTH INFO | 120 PIXELS | | LENGTH INFO | 300 PIXELS |
| | OBJECT NO. | 1 PIECE | | OBJECT NO. | 1 PIECE |
| OBJECT #2 DATA | CLOSED REGION #6 DATA | | OBJECT #1 DATA | CLOSED REGION #7 DATA | |
| | LENGTH INFO | 300 PIXELS | | LENGTH INFO | 1760 PIXELS |
| | OBJECT NO. | 1 PIECE | | OBJECT NO. | 0 PIECES |

DATA SEQUENCE →

FIG. 11B

| LINE START DATA | CLOSED REGION #11 DATA | | CLOSED REGION #12 DATA | | OBJECT #1 DATA | |
|---|---|---|---|---|---|---|
| | LENGTH INFO | 1000 PIXELS | LENGTH INFO | 300 PIXELS | | |
| | OBJECT NO. | 0 PIECES | OBJECT NO. | 1 PIECE | | |
| CLOSED REGION #13 DATA | | OBJECT #1 DATA | OBJECT #2 DATA | | CLOSED REGION #14 DATA | |
| LENGTH INFO | 300 PIXELS | | | | LENGTH INFO | 1000 PIXELS |
| OBJECT NO. | 2 PIECES | | | | OBJECT NO. | 3 PIECES |
| OBJECT #1 DATA | | OBJECT #2 DATA | OBJECT #3 DATA | | CLOSED REGION #15 DATA | |
| | | | | | LENGTH INFO | 300 PIXELS |
| | | | | | OBJECT NO. | 2 PIECES |
| OBJECT #1 DATA | | OBJECT #2 DATA | CLOSED REGION #16 DATA | | OBJECT #1 DATA | |
| | | | LENGTH INFO | 300 PIXELS | | |
| | | | OBJECT NO. | 1 PIECE | | |
| CLOSED REGION #17 DATA | | ...... (REPETITION FOR NUMBER OF LINES IN PROCESSING BAND) | | | LINE START DATA | |
| LENGTH INFO | 1760 PIXELS | | | | | |
| OBJECT NO. | 0 PIECES | | | | | |
| CLOSED REGION #11 DATA | | CLOSED REGION #12 DATA | | OBJECT #1 DATA | CLOSED REGION #13 DATA | |
| LENGTH INFO | 1000 PIXELS | LENGTH INFO | 300 PIXELS | | LENGTH INFO | 300 PIXELS |
| OBJECT NO. | 0 PIECES | OBJECT NO. | 1 PIECE | | OBJECT NO. | 2 PIECES |
| OBJECT #1 DATA | | OBJECT #2 DATA | CLOSED REGION #14 DATA | | OBJECT #1 DATA | |
| | | | LENGTH INFO | 1000 PIXELS | | |
| | | | OBJECT NO. | 3 PIECES | | |
| OBJECT #2 DATA | | OBJECT #3 DATA | CLOSED REGION #15 DATA | | OBJECT #1 DATA | |
| | | | LENGTH INFO | 300 PIXELS | | |
| | | | OBJECT NO. | 2 PIECES | | |
| OBJECT #2 DATA | | CLOSED REGION #16 DATA | | OBJECT #1 DATA | CLOSED REGION #17 DATA | |
| | | LENGTH INFO | 300 PIXELS | | LENGTH INFO | 1760 PIXELS |
| | | OBJECT NO. | 1 PIECE | | OBJECT NO. | 0 PIECES |

DATA SEQUENCE →

FIG. 12B

| | | | |
|---|---|---|---|
| LINE START DATA (INITIAL POSITION OF BLOCK 816) | CLOSED REGION #11 DATA / LENGTH INFO 1000 PIXELS / OBJECT NO. 0 PIECES | CLOSED REGION #12 DATA / LENGTH INFO 300 PIXELS / OBJECT NO. 1 PIECE | OBJECT #1 DATA |
| CLOSED REGION #13 DATA / LENGTH INFO 300 PIXELS / OBJECT NO. 2 PIECES | OBJECT #1 DATA | OBJECT #2 DATA | CLOSED REGION #14 DATA / LENGTH INFO 880 PIXELS / OBJECT NO. 3 PIECES |
| OBJECT #1 DATA | OBJECT #2 DATA | OBJECT #3 DATA | …… |
| (REPETITION FOR NUMBER OF LINES IN BLOCK) | | | |
| LINE START DATA | CLOSED REGION #11 DATA / LENGTH INFO 1000 PIXELS / OBJECT NO. 0 PIECES | CLOSED REGION #12 DATA / LENGTH INFO 300 PIXELS / OBJECT NO. 1 PIECE | OBJECT #1 DATA |
| CLOSED REGION #13 DATA / LENGTH INFO 300 PIXELS / OBJECT NO. 2 PIECES | OBJECT #1 DATA | OBJECT #2 DATA | CLOSED REGION #14 DATA / LENGTH INFO 880 PIXELS / OBJECT NO. 3 PIECES |
| OBJECT #1 DATA | OBJECT #2 DATA | OBJECT #3 DATA | LINE START DATA (INITIAL POSITION OF BLOCK 817) |
| CLOSED REGION #14 DATA / LENGTH INFO 120 PIXELS / OBJECT NO. 3 PIECES | OBJECT #1 DATA | OBJECT #2 DATA | OBJECT #3 DATA |
| CLOSED REGION #15 DATA / LENGTH INFO 300 PIXELS / OBJECT NO. 2 PIECES | OBJECT #1 DATA | OBJECT #2 DATA | CLOSED REGION #16 DATA / LENGTH INFO 300 PIXELS / OBJECT NO. 1 PIECE |
| OBJECT #1 DATA | CLOSED REGION #17 DATA / LENGTH INFO 1760 PIXELS / OBJECT NO. 0 PIECES | …… (REPETITION FOR NUMBER OF LINES IN BLOCK) | |
| LINE START DATA | CLOSED REGION #14 DATA / LENGTH INFO 120 PIXELS / OBJECT NO. 3 PIECES | OBJECT #1 DATA | OBJECT #2 DATA |
| OBJECT #3 DATA | CLOSED REGION #15 DATA / LENGTH INFO 300 PIXELS / OBJECT NO. 2 PIECES | OBJECT #1 DATA | OBJECT #2 DATA |
| CLOSED REGION #16 DATA / LENGTH INFO 300 PIXELS / OBJECT NO. 1 PIECE | OBJECT #1 DATA | CLOSED REGION #17 DATA / LENGTH INFO 1760 PIXELS / OBJECT NO. 0 PIECES | |

DATA SEQUENCE →

FIG. 15

| REGION | ACCUMULATION (EDGE HEIGHT) | ACCUMULATION (TRANSPARENT SPECIFICATION AREA) | ASSOCIATED EDGE ID |
|---|---|---|---|
| BAND REGION #1 (0 ≤ Y ≤ 31) | 32 PIXELS | 0 PIXELS | 0 |
| BAND REGION #2 (32 ≤ Y ≤ 63) | 224 PIXELS | 0 PIXELS | 0, 1, 2, 3, 4, 5, 6 |
| BAND REGION #3 (64 ≤ Y ≤ 95) | 224 PIXELS | 1000 PIXELS | 0, 1, 2, 3, 4, 5, 6 |
| ...... | | | |
| BAND REGION #N (6944 ≤ Y ≤ 6968) | 32 PIXELS | 0 PIXELS | 0 |

FIG. 16A
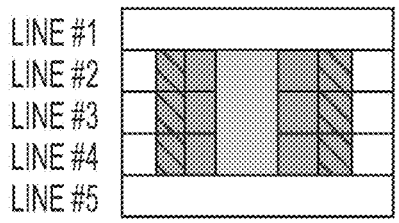
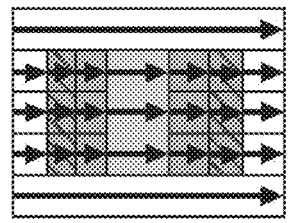
NUMBER OF CLOSED REGIONS: 23 PIECES
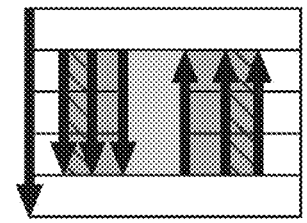
EDGE HEIGHT TOTAL: 23 PIXELS
FIG. 16B
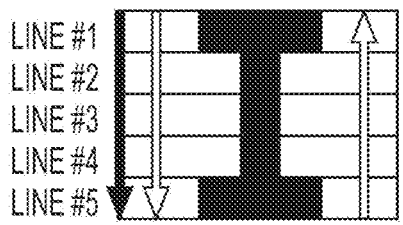
EDGE HEIGHT TOTAL: 15 PIXELS
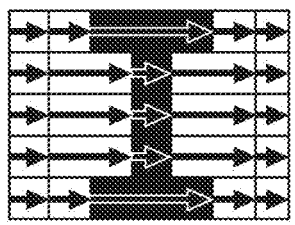
NUMBER OF CLOSED REGIONS: 25 PIECES
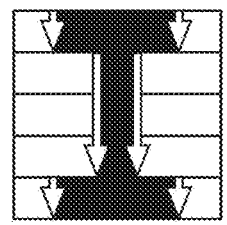
EDGE HEIGHT TOTAL: 10 PIXELS
FIG. 16C
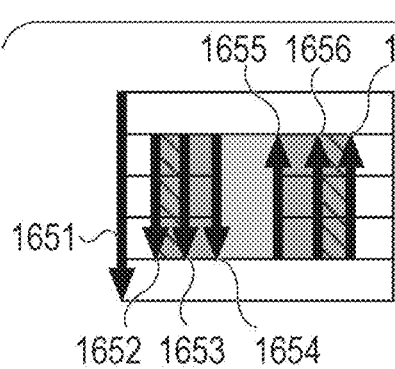
| EDGE ID | OBJECT START/END |
|---|---|
| 0 | NONE |
| 1 | START |
| 2 | START |
| 3 | START |
| 4 | END |
| 5 | END |
| 6 | END |
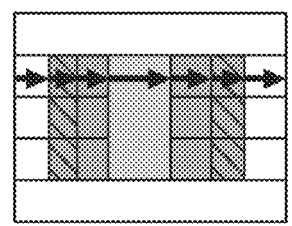
0 1 2 3 2 1 0

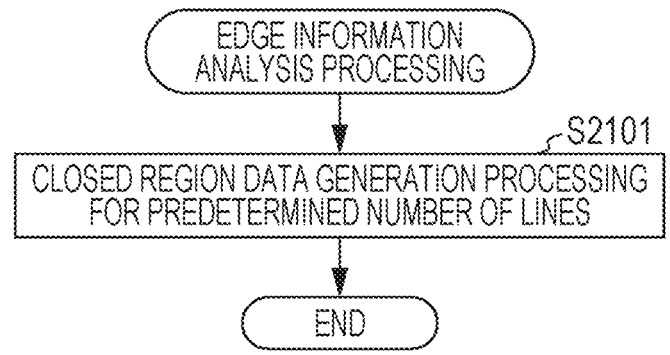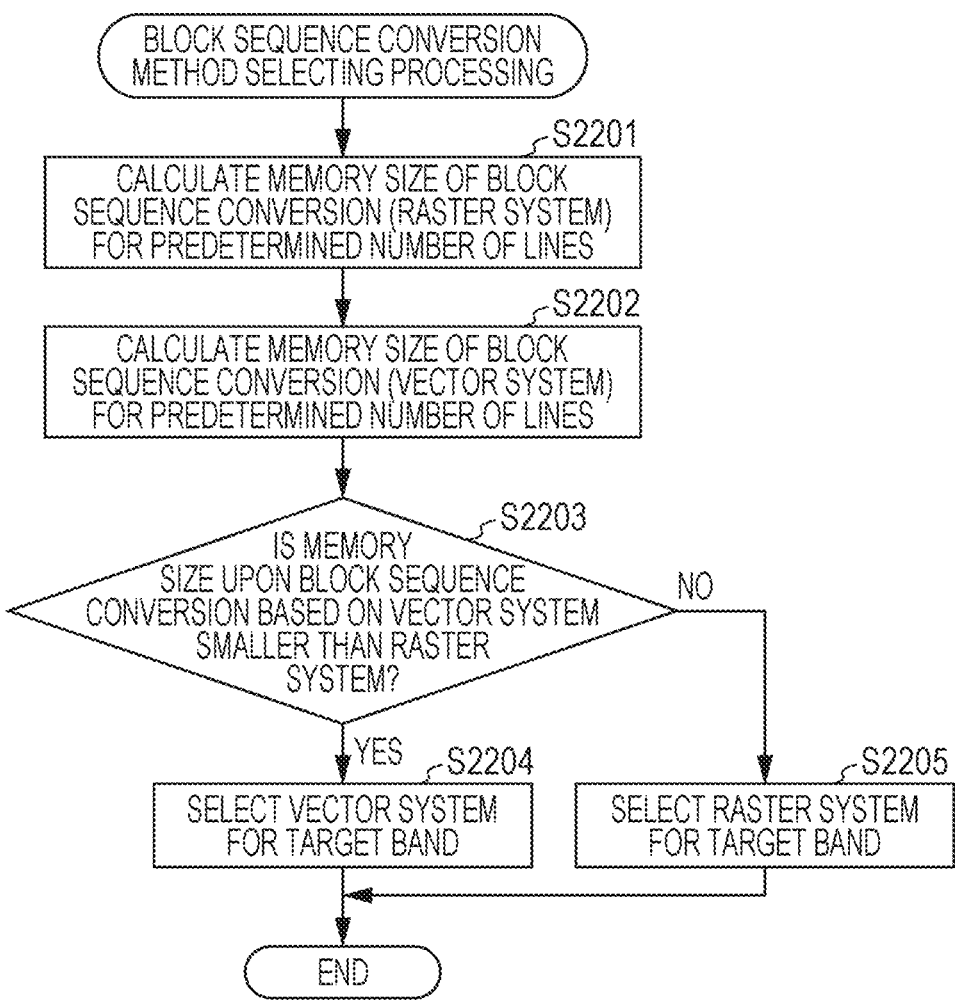

IMAGE PROCESSING APPARATUS THAT CONVERTS IMAGE DATA FROM LINE SEQUENCE TO BLOCK SEQUENCE, IMAGE PROCESSING METHOD, AND STORAGE MEDIUM

CROSS-REFERENCE TO RELATED APPLICATION

This application is a Continuation of U.S. application Ser. No. 15/354648, filed Nov. 17, 2016, which claims priority from Japanese Patent Application No. 2015-226939, filed Nov. 19, 2015, which are hereby incorporated by reference herein in their entireties.

BACKGROUND OF THE INVENTION

Field of the Invention

The aspect of the embodiments relates to an image processing apparatus, an image processing method, and a storage medium. The aspect of the embodiments particularly relates to a technology for converting image data from a line sequence to a block sequence.

Description of the Related Art

A technology has been proposed for converting image data into image data for each block and performing subsequent image processing in parallel in units of block to carry out printing at a high speed at the time of image forming processing. The processing of converting the image data into the image data for each block is referred to as block sequence conversion processing. The block sequence conversion processing is processing of dividing image data that has been input to a work buffer in a page line sequence and buffered for a predetermined block height into image data for each set of plural blocks to be output in a block sequence. In this manner, in the block sequence conversion processing, the image data is to be temporarily buffered in the work buffer, and a predetermined buffer size is to be secured.

Japanese Patent Laid-Open No. 2009-269355 describes a technology for storing image data in a work buffer in a vector system before rendering instead of a raster system after rendering.

However, in a case where the vector system block sequence conversion processing described in Japanese Patent Laid-Open No. 2009-269355 is applied to page image data where a large number of drawing objects exist, a memory size of the work buffer may be significantly increased in some cases.

SUMMARY OF THE INVENTION

An apparatus that performs image processing on input image data in parallel in units of block according to an aspect of the invention includes a derivation unit configured to derive a memory size used in conversion processing of converting data alignment sequence in the image data from a line sequence into a block sequence which is executed before rendering of the image data and a memory size used in the conversion processing which is executed after the rendering of the image data, a determination unit configured to determine a timing for executing the conversion processing based on the derivation results, and a conversion unit configured to execute the conversion processing at the determined timing.

Further features of the aspect of the embodiments will become apparent from the following description of exemplary embodiments with reference to the attached drawings.

BRIEF DESCRIPTION OF THE DRAWINGS

FIGS. 9A and 9B are explanatory diagrams for describing line sequence vector data according to the first exemplary embodiment of the present disclosure.

FIGS. 10A and 10B are explanatory diagrams for describing block sequence vector data according to the first exemplary embodiment of the present disclosure.

FIGS. 11A and 11B are explanatory diagrams for describing the line sequence vector data according to the first exemplary embodiment of the present disclosure.

FIGS. 12A and 12B are explanatory diagrams for describing the block sequence vector data according to the first exemplary embodiment of the present disclosure.

FIG. 15 is an explanatory diagram illustrating an edge information analysis table according to the first exemplary embodiment of the present disclosure.

FIGS. 16A to 16C are explanatory diagrams for describing processing of calculating the number of closed regions and the number of objects in the closed regions according to the first exemplary embodiment of the present disclosure.

FIG. 21 is a flow chart illustrating the edge information analysis processing according to the second exemplary embodiment of the present disclosure.

FIG. 22 is a flow chart illustrating the block sequence conversion method selecting processing according to the second exemplary embodiment of the present disclosure.

DESCRIPTION OF THE EMBODIMENTS

Hereinafter, exemplary embodiments disclosed in the present specification will be described with reference to the drawings.

First Exemplary Embodiment

Figure 1A:
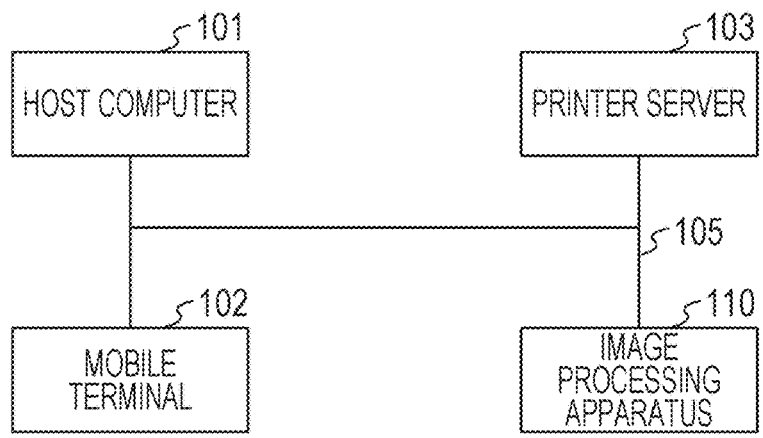
FIGS. 1A and 1B are block diagrams illustrating examples of configurations of a system and an image processing apparatus according to a first exemplary embodiment of the present disclosure.
Figure 1B:
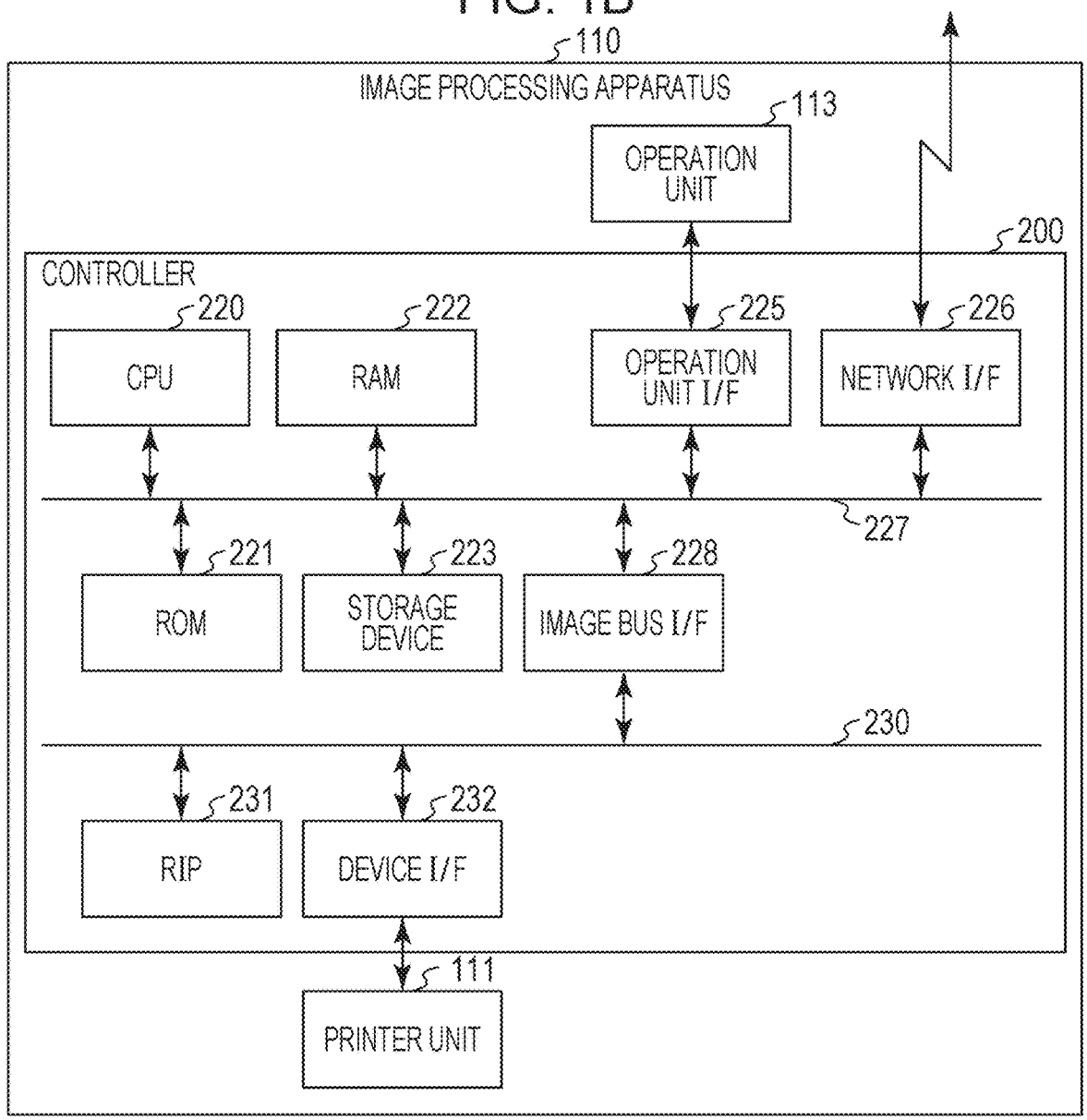

FIGS. 1A and 1B are block diagrams illustrating examples of configurations of a system and an image processing apparatus according to the present exemplary embodiment. The system illustrated in FIG. 1A is provided with a host computer 101, a mobile terminal 102, a printer server 103, and an image processing apparatus 110. The host computer 101, the mobile terminal 102, the printer server 103, and the image processing apparatus 110 are connected to one another via a LAN 105.

The host computer 101, the mobile terminal 102, and the printer server 103 generate page description language (PDL) data corresponding to page image data indicating page information to be printed on the basis of a user operation and transmit the PDL data to the image processing apparatus 110. The image processing apparatus 110 performs printing processing on the basis of the received PDL data. The image processing apparatus 110 may be any one of printers among a multi function printer (MFP) and a single function printer (SFP). The image processing apparatus 110 may also be a printer other than the MFP or the SFP.

With reference to FIG. 1B, a hardware configuration of the image processing apparatus 110 according to the present exemplary embodiment will be described. As illustrated in FIG. 1B, the image processing apparatus 110 includes a printer unit 111, an operation unit 113, and a controller 200. The controller 200 includes a CPU 220, a ROM 221, a RAM 222, a storage device 223, an operation unit interface (I/F) 225, a network I/F 226, an image bus I/F 228, a raster image processor (RIP) 231, and a device I/F 232.

The CPU 220, the ROM 221, the RAM 222, the storage device 223, the operation unit I/F 225, the network I/F 226, and the image bus I/F 228 are connected to one another via a system bus 227. The image bus I/F 228, the RIP 231, and the device I/F 232 are connected to one another via an image bus 230. In addition, the system bus 227 and the image bus 230 are connected to each other via the image bus I/F 228.

The printer unit 111 is an image output device. While the image processing apparatus 110 is connected to the LAN 105, the image processing apparatus 110 performs control so as to input and output the PDL data or device information via the LAN 105. Image data generated by the image processing apparatus 110 is input to the printer unit 111 via the device I/F 232, and the input image data is output to a recording medium such as paper.

The CPU 220 is a central processing unit configured to control the entirety of the image processing apparatus 110.

The ROM 221 is a boot ROM and stores a boot program of the system.

The RAM 222 is a system work memory used for the CPU 220 to operate. The RAM 222 also temporarily stores PDL data transmitted from an external apparatus, intermediate data generated in the image processing apparatus 110 at the time of the printing processing, or input data. In addition, the RAM 222 functions as a work area corresponding to an operation area used to perform the rendering processing.

The storage device 223 is, for example, a hard disc drive. The storage device 223 stores system software for various processings and the PDL data transmitted from the external apparatus.

The operation unit I/F 225 is an interface for connecting the operation unit 113 including a display screen on which various menus, printing data information, and the like can be displayed to the system bus 227. The operation unit I/F 225 outputs operation screen data to the operation unit 113. In addition, the operation unit I/F 225 transfers information input to the operation unit 113 by an operator to the CPU 220.

The network I/F 226 is connected to the LAN 105 illustrated in FIGS. 1A and 1B. The network I/F 226 performs input and output of information with the external apparatus via the LAN 105.

The image bus I/F 228 is an interface for connecting the system bus 227 to the image bus 230 that transfers the image data at a high speed and is a bus bridge configured to convert a data structure.

The RIP 231 analyzes the PDL data or the intermediate data (display list) to be developed into an image.

The device I/F 232 is an interface for connecting the printer unit 111 to the image bus 230. The device I/F 232 performs synchronous/asynchronous conversion of the image data.

Software Configuration of the Image Processing Apparatus

Figure 2:
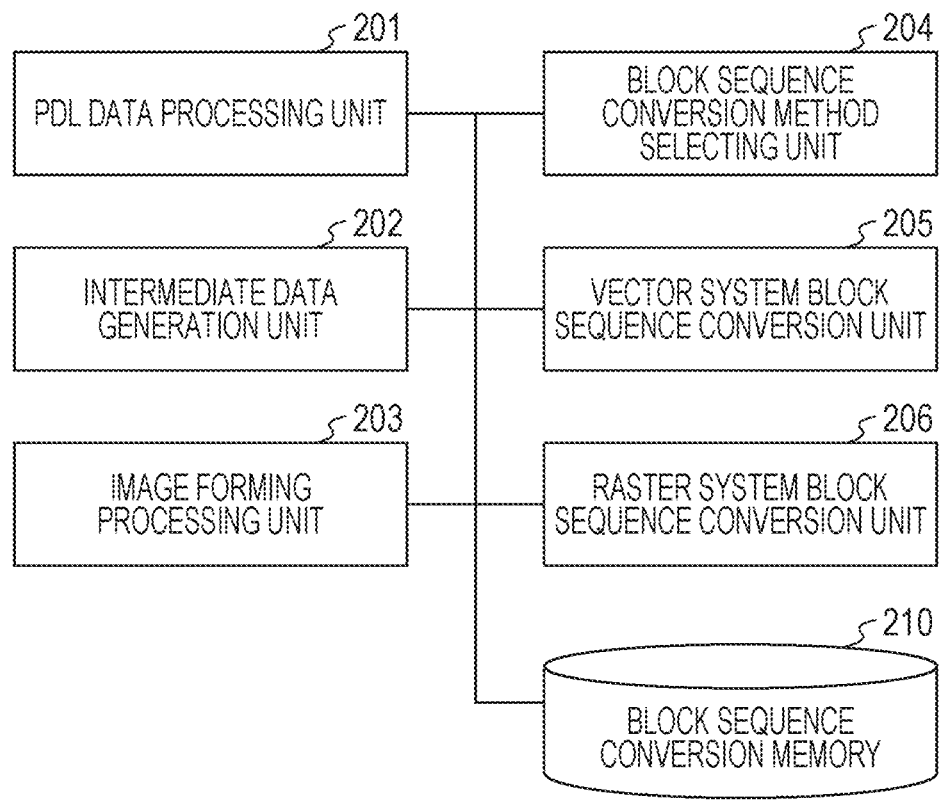
FIG. 2 is a block diagram illustrating an example of a software configuration of the image processing apparatus according to the first exemplary embodiment of the present disclosure.

FIG. 2 is a block diagram illustrating a software configuration of the image processing apparatus 110 according to the present exemplary embodiment. As illustrated in FIG. 2, the image processing apparatus 110 includes a PDL data processing unit 201, an intermediate data generation unit 202, an image forming processing unit 203, a block sequence conversion method selecting unit 204, a vector system block sequence conversion unit 205, a raster system block sequence conversion unit 206, and a block sequence conversion memory 210.

The PDL data processing unit 201 obtains page information and object information included in the page information from the PDL data received from the external apparatus such as the host computer 101. The PDL data processing unit 201 hands over the obtained information to the intermediate data generation unit 202.

The intermediate data generation unit 202 generates intermediate data on the basis of the page information and the object information received from the PDL data processing unit 201.

The block sequence conversion method selecting unit 204 selects a block sequence conversion method of the data from a vector system and a raster system. The block sequence conversion method selecting unit 204 determines one of the block sequence conversion method based on the vector system and the block sequence conversion method based on the raster system to perform the block sequence conversion by using a smaller memory on the basis of the intermediate data generated by the intermediate data generation unit 202. That is, the block sequence conversion method selecting unit 204 determines one of timings before and after rendering to perform the block sequence conversion by using a smaller memory used for the conversion.

The block sequence conversion method selecting unit 204 selects the block sequence conversion method on the basis of the determination result. The block sequence conversion method selecting unit 204 notifies the image forming processing unit 203 of the selected block sequence conversion method. A detail of the detail of the block sequence conversion method selecting processing will be described below.

The image forming processing unit 203 performs bitmap image data (raster data) generation processing (hereinafter, will be referred to as image forming processing) from the intermediate data received from the intermediate data generation unit 202. In addition, to generate block sequence raster data, the image forming processing unit 203 converts the data into block sequence data on the basis of the block sequence conversion method selected by the block sequence conversion method selecting unit 204. When the block sequence conversion processing of the data is performed, the image forming processing unit 203 causes the vector system block sequence conversion unit 205 or the raster system block sequence conversion unit 206 to execute processing of converting the data into the block sequence data.

In a case where the vector system is selected as the block sequence conversion method, the image forming processing unit 203 stores the vector data internally used by the image forming processing unit 203 in the block sequence conversion memory 210. The vector system block sequence conversion unit 205 converts the vector data stored in the block sequence conversion memory 210 into the block sequence vector data and hands over the converted block sequence vector data to the image forming processing unit 203. The image forming processing unit 203 generates raster data by rendering the received block sequence vector data. As a result, the block sequence raster data is generated. The image forming processing unit 203 applies image processing (such as rotation processing) on the generated block sequence raster data and generates the final bitmap image data to be output. A detail of the processing in the vector system block sequence conversion unit 205 will be described below.

On the other hand, in a case where the raster system is selected as the block sequence conversion method, the image forming processing unit 203 stores the raster data obtained by rendering the intermediate data in the block sequence conversion memory 210. The raster system block sequence conversion unit 206 converts the raster data stored in the block sequence conversion memory 210 into the block sequence raster data to be handed over to the image forming processing unit 203. The image forming processing unit 203 applies the image processing (such as the rotation processing) on the received block sequence raster data and generates the final bitmap image data to be output. A detail of the processing in the raster system block sequence conversion unit 206 will be described below.

PDL Printing Processing in the Image Processing Apparatus

Figure 3:
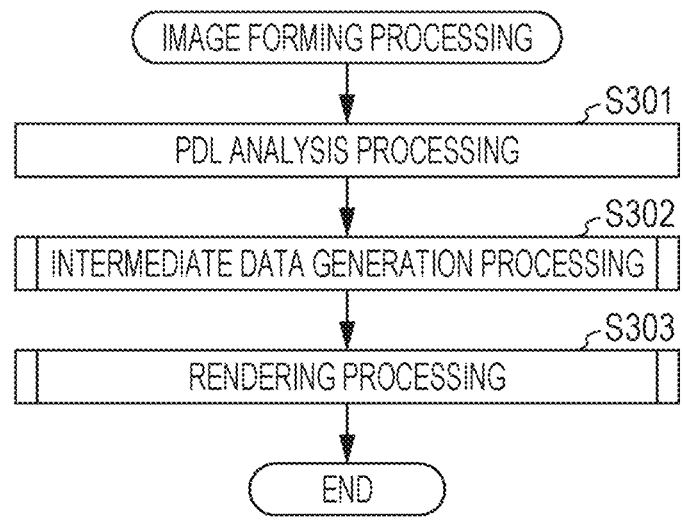
FIG. 3 is a flow chart illustrating processing of the image processing apparatus according to the first exemplary embodiment of the present disclosure.

FIG. 3 is a flow chart illustrating the image forming processing of the image processing apparatus 110 according to the present exemplary embodiment. FIG. 3 illustrates a series of flows of the printing processing on the PDL data in the image processing apparatus 110. The processing illustrated in FIG. 3 is executed by the CPU 220. Specifically, the CPU 220 loads a program for executing the processing illustrated in FIG. 3 from the ROM 221 to the RAM 222 to be executed, and the processing illustrated in FIG. 3 is executed. It should be noted that a configuration may also be adopted in which a CPU, a ROM, and a RAM of an external apparatus (for example, the printer server 103) instead of the CPU 220, the ROM 221, and the RAM 222 of the image processing apparatus 110 execute the processing illustrated in FIG. 3.

First, the PDL data is transmitted from the host computer 101, the mobile terminal 102, or the printer server 103 to the image processing apparatus 110. Subsequently, the CPU 220 of the image processing apparatus 110 stores the received PDL data in the storage device 223.

Next, the CPU 220 obtains the PDL data stored in the storage device 223 and performs analysis processing of the obtained PDL data (step S301).

Next, the CPU 220 performs generation processing of the intermediate data used to generate the bitmap image data on the basis of the information of the analyzed PDL data (step S302). In the processing in step S302, two processings including edge information analysis processing and block sequence conversion method selecting processing corresponding to features of the present exemplary embodiment are performed in addition to intermediate data generation processing based on a related-art technology.

Next, the CPU 220 performs the rendering processing accompanied by the block sequence conversion processing on the basis of the generated intermediate data and the selection result of the block sequence conversion method selecting processing and generates bitmap image data representing a page image (step S303). It should be noted that the generated bitmap image data is the block image data where the page image is set in the block sequence, and subsequent image processing is applied to this block image data in units of block.

Detail of Intermediate Data Generation Processing

Figure 4:
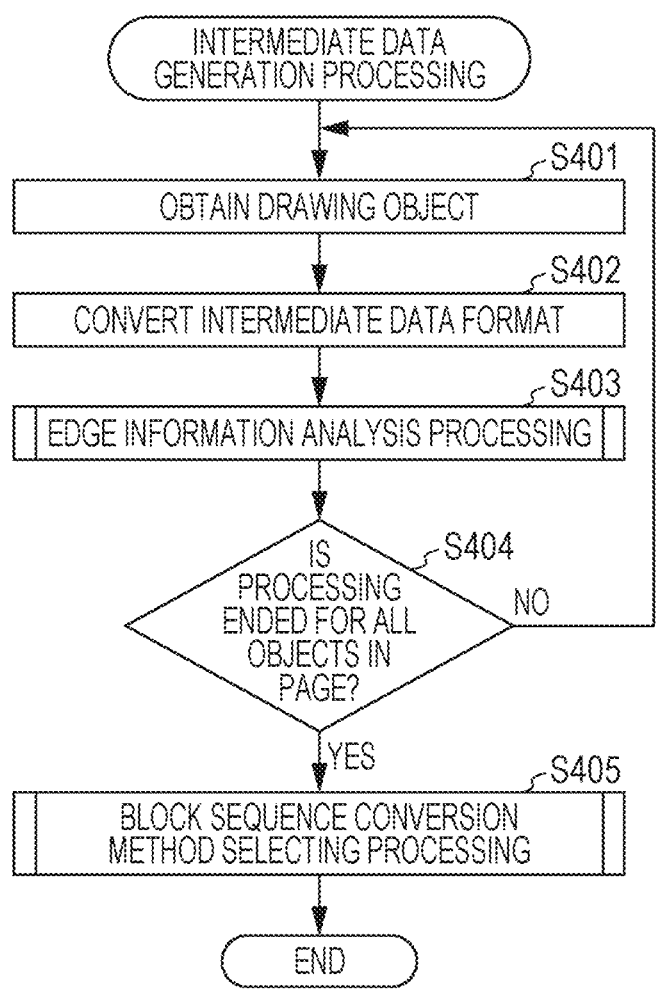
FIG. 4 is a flow chart illustrating intermediate data generation processing according to the first exemplary embodiment of the present disclosure.

FIG. 4 is a flow chart illustrating intermediate data generation processing according to the present exemplary embodiment. The intermediate data generation processing according to the present exemplary embodiment includes the edge information analysis processing and the block sequence conversion method selecting processing corresponding to the features of the present exemplary embodiment as described above.

First, the CPU 220 obtains a drawing object included in the PDL data extracted by the PDL analysis processing in step S301 (step S401).

Next, the CPU 220 converts the drawing object obtained in step S401 into a predetermined intermediate data format (step S402).

Next, the CPU 220 performs analysis processing of edge information corresponding to information indicating an outline (edge) of the obtained drawing object (step S403). At this time, the CPU 220 extracts information used to select the block sequence conversion method in the rendering processing in step S303 from the edge information of the drawing object. A detail of the processing in step S403 will be described below.

Next, the CPU 220 determines whether or not the processing for the drawing objects included in the PDL data, that is, all the drawing objects in the page is ended (step S404). In a case where the processing is not ended, the CPU 220 returns to the processing in step S401. In a case where the processing is ended, the CPU 220 proceeds to the processing in step S405.

Next, the CPU 220 selects the block sequence conversion method on the basis of the information extracted in step S403 from the edge information (step S405). In the processing in step S405, the CPU 220 determines one of the systems including the vector system and the raster system to perform the block sequence conversion by using a smaller memory consumption and determines one of the systems for the block sequence conversion method. Then, the CPU 220 stores information indicating the determined block sequence conversion method in a block sequence conversion method table that will be described below. The detail of the block sequence conversion method selecting processing will be described below.

Detail of the Rendering Processing

Figure 5:
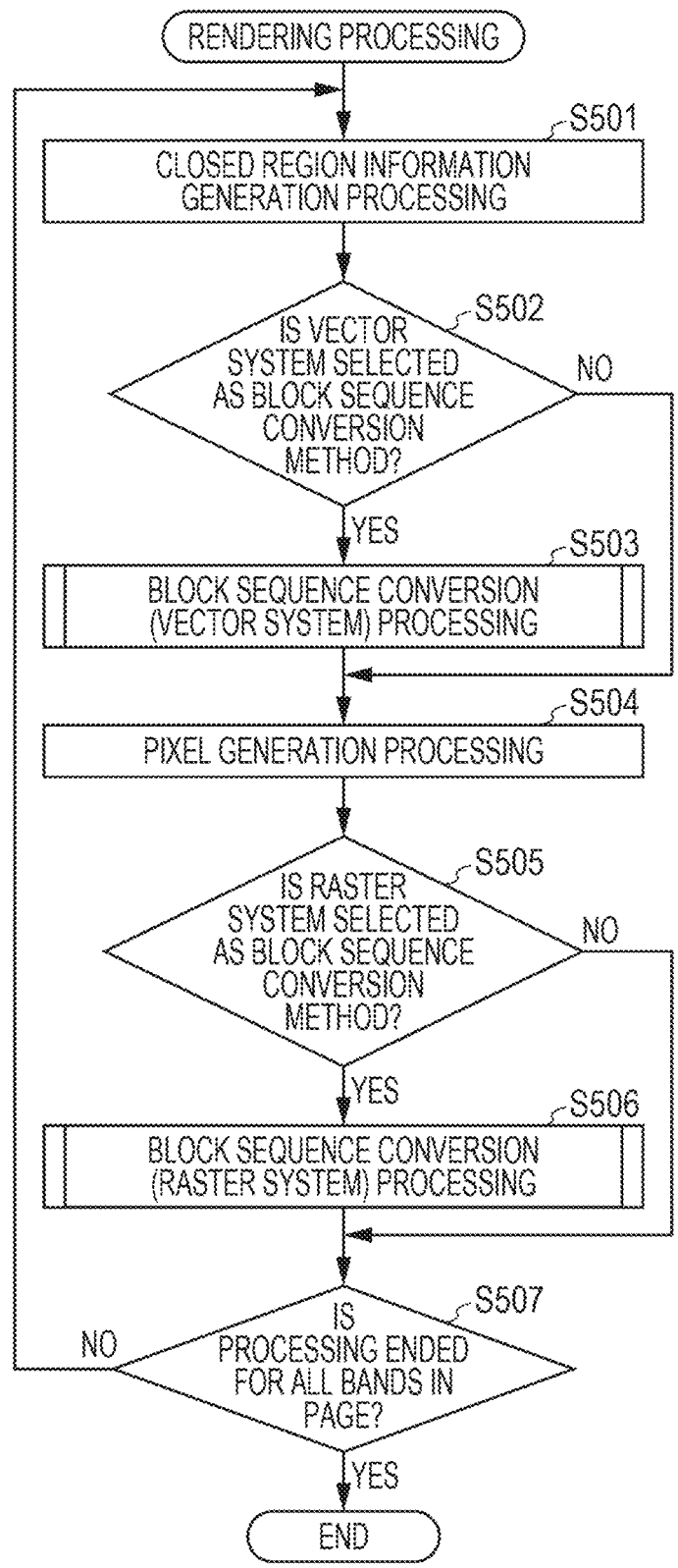
FIG. 5 is a flow chart illustrating rendering processing according to the first exemplary embodiment of the present disclosure.

FIG. 5 is a flow chart illustrating rendering processing according to the present exemplary embodiment (processing in step S303). The rendering processing according to the present exemplary embodiment includes the block sequence conversion processing corresponding to the feature of the present exemplary embodiment. FIGS. 6A to 6D are explanatory diagrams for describing closed region data generated by the rendering processing according to the present exemplary embodiment.

First, the CPU 220 performs generation processing of the closed region data corresponding to the vector data dealt in the rendering processing on the basis of the intermediate data generated in step S302 (step S501).

With reference to FIGS. 6A to 6D, the closed region data corresponding to the vector data will be described. Herein, pages (pages 610 and 611 illustrated in FIGS. 6B and 6C) including mutually overlapping three drawing objects (objects 601 to 603 illustrated in FIG. 6A) will be described as an example.

Figure 6A:
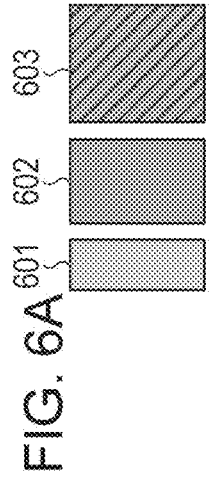
FIGS. 6A to 6D are explanatory diagrams for describing closed region data generated by the rendering processing according to the first exemplary embodiment of the present disclosure.
Figure 6B:
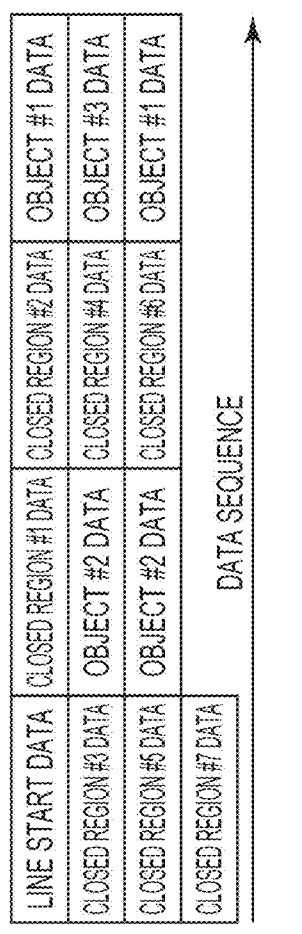
Figure 6C:
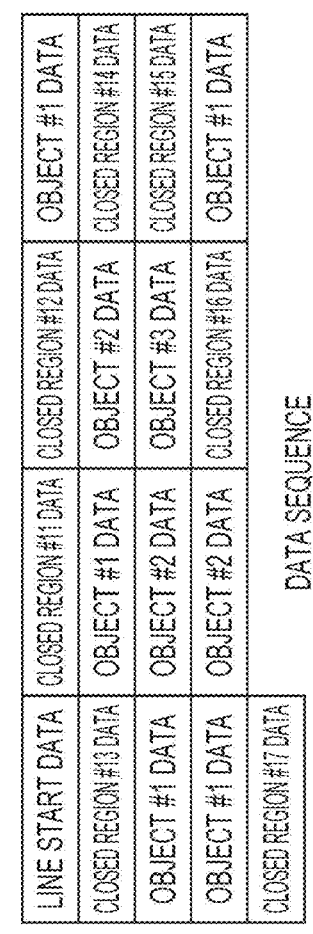

FIG. 6B schematically illustrates the page 610 including the objects 601 to 603 having no transparent specifications and also a line 612 and vector data of the line 612 in the page 610. FIG. 6C schematically illustrates the page 611 including the objects 601 to 603 having transparent specifications and also a line 613 and vector data of the line 613 in the page 611.

The vector data of the line includes information indicating a start of the line (hereinafter, will be referred to as line start data) and information indicating a region sectioned by outlines of the objects which is called a closed region (hereinafter, will be referred to as closed region data). As illustrated in FIG. 6B, the line 612 is constituted by seven regions (closed regions 621 to 627) sectioned by the outlines. Therefore, the vector data of the line 612 includes seven pieces of closed region data corresponding to the closed regions 621 to 627. Similarly, as illustrated in FIG. 6C, the line 613 is constituted by seven regions (closed regions 631 to 637) sectioned by the outlines. Therefore, the vector data of the line 613 includes seven pieces of closed region data corresponding to the closed regions 631 to 637.

Hereinafter, the objects 601 to 603 may be denoted by objects #1 to #3 in some cases. The lines 612 and 613 may be denoted by lines #1 and #2 in some cases. The closed regions 621 to 627 may be denoted by closed regions #1 to #7 in some cases. The closed regions 631 to 637 may be denoted by closed regions #11 to #17 in some cases.

Figure 6D:
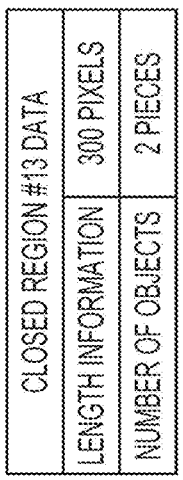

FIG. 6D illustrates an example of a configuration of the closed region data included in the vector data. The closed region data illustrated in FIG. 6D is an example of the closed region data corresponding to the closed regions 622 and 633 (the closed regions #2 and #13). As illustrated in FIG. 6D, the closed region data includes length information indicating a width (length) of the closed region and object number information indicating the number of objects included in the closed region (hereinafter, will be simply referred to as the number of objects). The closed region data is accompanied by information of the respective objects included in the closed region (object data). The object data is information indicating an attribute, a color, or the like of the object.

In step S501, the CPU 220 performs the generation processing of the closed region data with regard to the band having a predetermined height, that is, the band having a predetermined number of lines.

Figures 7, 8:
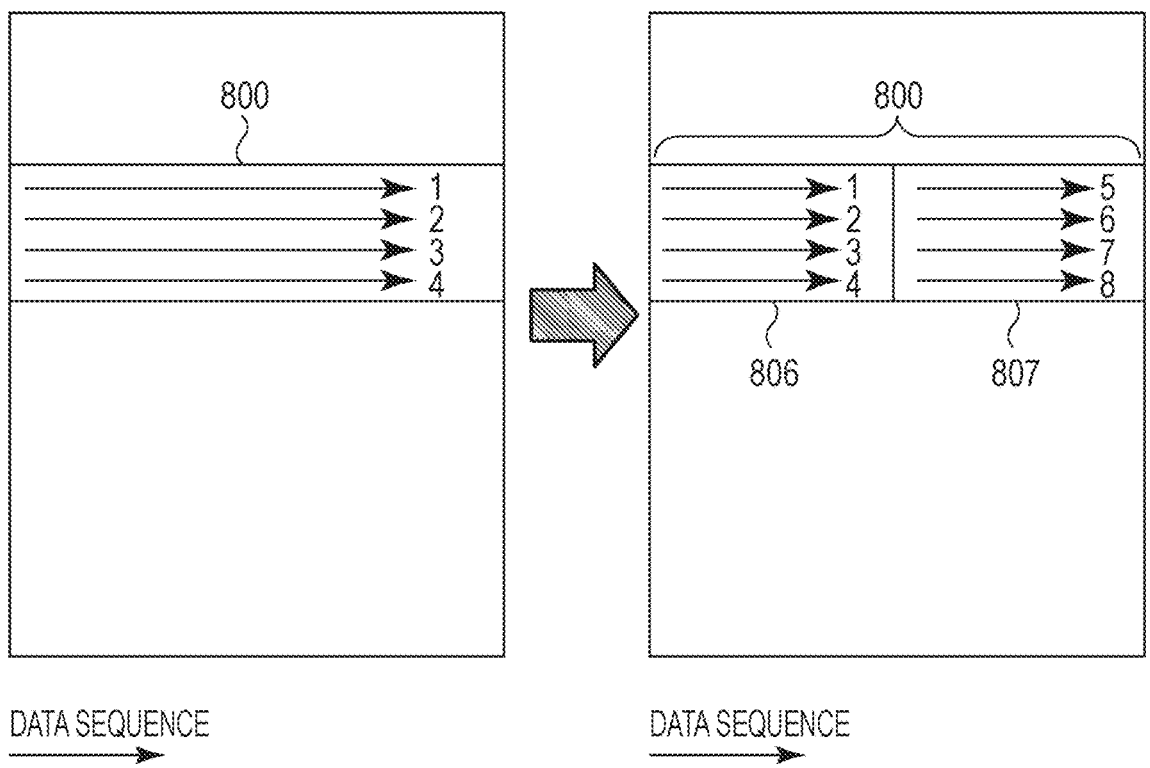
FIG. 7 is an explanatory diagram illustrating an example of a block sequence conversion method table according to the first exemplary embodiment of the present disclosure.
FIG. 8 is an explanatory diagram illustrating a situation where page data is converted from a line sequence into a block sequence.

Next, the CPU 220 determines whether or not the block sequence conversion method corresponding to the currently processed band (hereinafter, will be referred to a as processing band) is the vector system in accordance with the block sequence conversion method table generated in the processing in step S405 (step S502). FIG. 7 is an explanatory diagram illustrating an example of the block sequence conversion method table according to the present exemplary embodiment. The block sequence conversion method table is a table indicating the block sequence conversion method corresponding to each band in the page. Y illustrated in FIG. 7 denotes the number of pixels from an initial position of the page in a sub scanning direction. For example, the band region #2 is a region (band) located at positions where pixels from the initial position of the page in the sub scanning direction correspond to numbers 32 to 63.

In a case where the block sequence conversion method is not the vector system (step S502: NO), the CPU 220 shifts to the processing in step S504.

In a case where the block sequence conversion method is the vector system (step S502: YES), the CPU 220 temporarily stores the vector data corresponding to the processing band generated by the processing in step S501 in the block sequence conversion memory 210. Then, the CPU 220 converts the vector data stored in the block sequence conversion memory 210 into the block sequence (step S503). FIG. 8 is an explanatory diagram illustrating a situation where the vector data is converted from the line sequence to the block sequence. A left drawing in FIG. 8 illustrates the line sequence vector data. A right drawing in FIG. 8 illustrates the block sequence vector data. When the vector data is generated from the intermediate data, the CPU 220 sequentially generates the closed region data in units of line from left (left in FIG. 8) to right (right in FIG. 8) with respect to a processing band 800. As a result, the line sequence vector data is generated. In the processing in step S503, the CPU 220 converts the vector data from the line sequence to the block sequence by dividing the line sequence vector data in units of block. According to the present exemplary embodiment, the processing band 800 is divided into two blocks including a block 806 and a block 807.

Figure 10A:
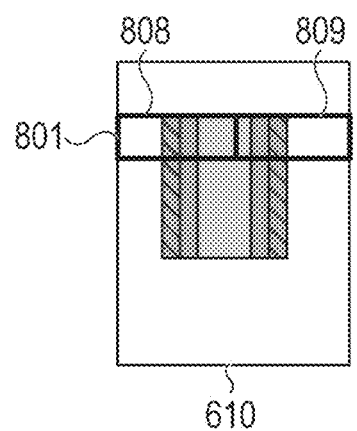

Here, with reference to FIGS. 9A and 9B and FIGS. 10A and 10B, processing of converting the vector data of the page 610 illustrated in FIG. 6B from the line sequence to the block sequence will be described. FIGS. 9A and 9B are explanatory diagrams for describing the line sequence vector data according to the present exemplary embodiment. FIGS. 10A and 10B are explanatory diagrams for describing the block sequence vector data according to the present exemplary embodiment. FIGS. 9A and 9B and FIGS. 10A and 10B illustrate a situation where the vector data corresponding to a processing band 801 of the page 610 is divided into two blocks (a block 808 and a block 809).

In processing in step S503, first, the CPU 220 generates the closed region data in the line sequence with respect to the processing band 801. As a result, the line sequence vector data as illustrated in FIG. 9B is generated. The CPU 220 stores the generated vector data in the block sequence conversion memory 210. Subsequently, the CPU 220 reads out the line sequence vector data corresponding to the processing band 801 stored in the block sequence conversion memory 210. At this time, the CPU 220 reads out the line sequence vector data in the block sequence. As a result, the sequence of the closed region data is converted into the block sequence as illustrated in FIG. 10B.

Figure 11A:
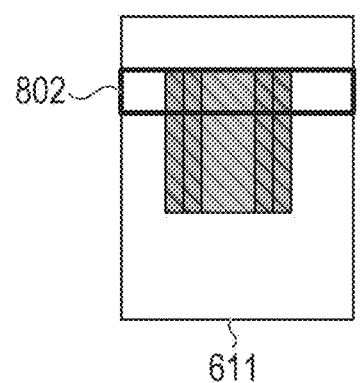
Figure 12A:
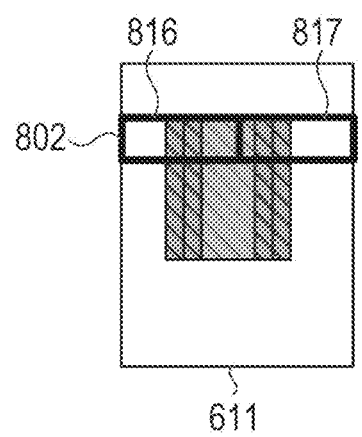

Here, with reference to FIGS. 11A and 11B and FIGS. 12A and 12B, processing of converting the vector data of the page 611 illustrated in FIG. 6C from the line sequence to the block sequence will be described. FIGS. 11A and 11B are explanatory diagrams for describing the line sequence vector data according to the present exemplary embodiment. FIGS. 12A and 12B are explanatory diagrams for describing the block sequence vector data according to the present exemplary embodiment. FIGS. 11A and 11B and FIGS. 12A and 12B illustrate a situation where the vector data in a processing band 802 of the page 611 is divided into two block (a block 816 and a block 817).

First, the CPU 220 generates the closed region data in the line sequence with respect to the processing band 802. As a result, the line sequence vector data is generated as illustrated in FIG. 12B. The CPU 220 stores the generated vector data in the block sequence conversion memory 210. Subsequently, the CPU 220 reads out the line sequence vector data corresponding to the processing band 802 stored in the block sequence conversion memory 210. At this time, the CPU 220 reads out the line sequence vector data in the block sequence. As a result, the sequence of the closed region data is converted into the block sequence as illustrated in FIG. 12B.

Next, the CPU 220 executes rendering on the basis of the vector data and generates the raster data (step S504). The raster data is information including CMYK data of the respective pixels in the page (hereinafter, will be also simply referred to as CMYK). It should be noted that, in a case where the block sequence conversion method is the vector system, since the vector data is converted into the block sequence in the processing in step S503, the raster data generated in the processing in step S504 is also generated in the block sequence. On the other hand, in a case where the block sequence conversion method is the raster system, since the processing in step S503 is not executed, the raster data generated in the processing in step S504 is generated in the line sequence. The raster data may also include pixel data other than CMYK.

Next, the CPU 220 performs processing of referring to the block sequence conversion method table and determining whether or not the block sequence conversion method corresponding to the processing band is the raster system (step S505).

In a case where the block sequence conversion method is not the raster system (step S505: NO), the CPU 220 shifts to the processing in step S507.

In a case where the block sequence conversion method is the raster system (step S505: YES), the CPU 220 converts the raster data generated in the line sequence in the processing in step S504 into the block sequence (step S506). At this time, first, the CPU 220 temporarily stores the raster data corresponding to the processing band generated in the processing in step S504 in the block sequence conversion memory 210. Then, the CPU 220 converts the raster data stored in the block sequence conversion memory 210 from the line sequence into the block sequence similarly as in the block sequence conversion of the vector data illustrated in FIG. 8.

Figure 13A:
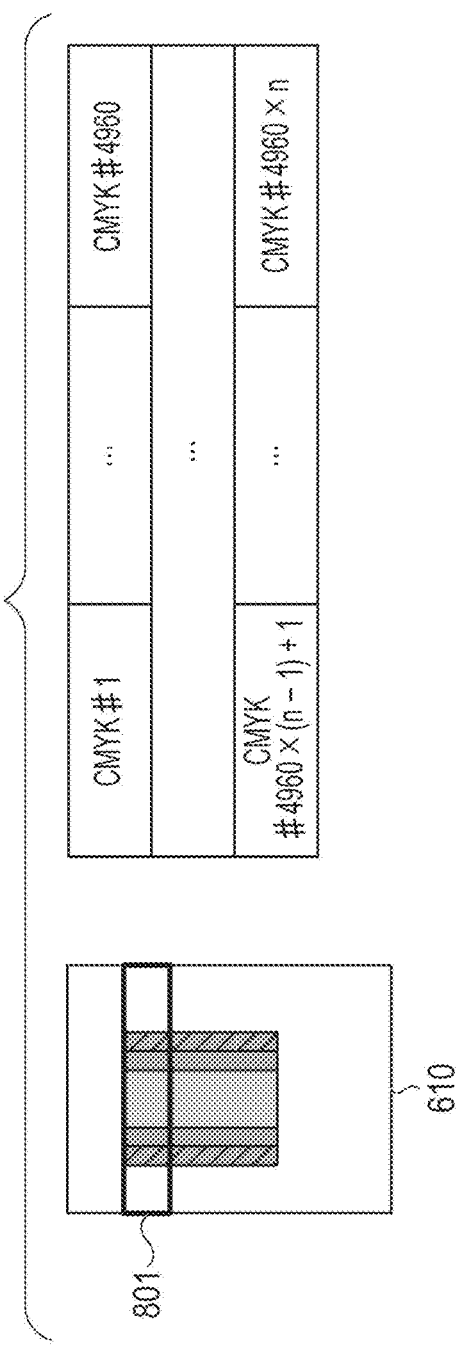
FIGS. 13A and 13B are explanatory diagrams for describing line sequence and block sequence raster data according to the first exemplary embodiment of the present disclosure.
Figure 13B:
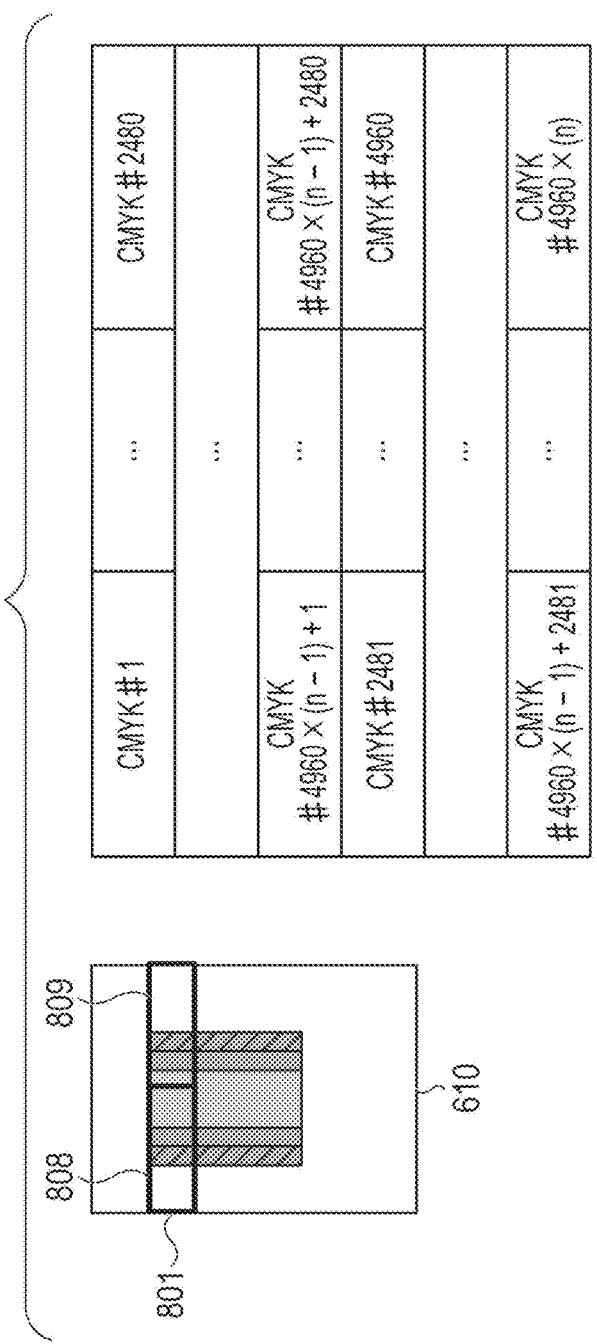

Here, with reference to FIGS. 13A and 13B, processing of converting the raster data of the page 610 illustrated in FIG. 6B from the line sequence into the block sequence will be described. FIGS. 13A and 13B are explanatory diagrams for describing the line sequence and block sequence raster data according to the present exemplary embodiment. FIGS. 13A and 13B illustrate a situation where the raster data corresponding to the processing band 801 of the page 610 is divided into the two blocks (the block 808 and the block 809).

As described above, in a case where the block sequence conversion method is the raster system, in the processing in step S504, the raster data is generated in the line sequence. A right drawing of FIG. 13A illustrates the raster data corresponding to the processing band 801 generated in the line sequence. In the processing in step S506, first, the CPU 220 stores the raster data generated by the processing in step S504 in the block sequence conversion memory 210. Subsequently, the CPU 220 reads out the raster data in the line sequence corresponding to the processing band 801 stored in the block sequence conversion memory 210. At this time, the CPU 220 reads out the raster data in the line sequence in the block sequence. As a result, the sequence of CMYK is converted into the block sequence as illustrated in a right drawing of FIG. 13B. Herein, the page 610 including the objects having no transparent specification has been described as an example. However, since the pixel generation processing (processing in step S504) has been already executed in the processing in step S506, the size of the raster data is the same irrespective of the presence or absence of the transparent specification. Therefore, descriptions in a case where the transparent specification is present will be omitted.

Next, the CPU 220 determines whether or not the processing is ended for all the bands included in the page image data (step S507). When it is determined that the processing is not ended (step S507: NO), the CPU 220 returns to the processing in step S501. When it is determined that the processing is ended (step S507: YES), the CPU 220 ends the processing.

Detail of the Edge Information Analysis Processing

Figure 14:
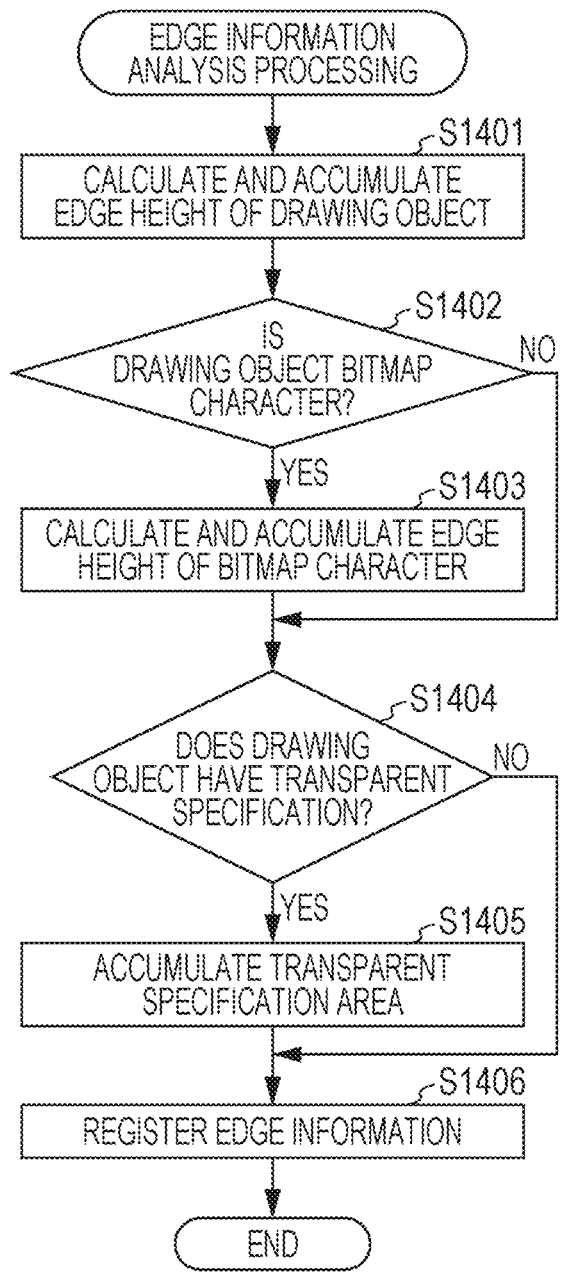
FIG. 14 is a flow chart illustrating edge information analysis processing according to the first exemplary embodiment of the present disclosure.

FIG. 14 is a flow chart illustrating the edge information analysis processing according to the present exemplary embodiment (processing in step S403). With regard to the edge information analysis processing, the CPU 220 extracts information used to select the block sequence conversion method from the edge information of the drawing object in the rendering processing (processing in step S303). The CPU 220 stores the extracted information in an edge information analysis table. FIG. 15 is an explanatory diagram illustrating the edge information analysis table according to the present exemplary embodiment. As illustrated in FIG. 15, the edge information analysis table is a table that stores an accumulated total of heights of edges of the drawing objects existing in the band region for each band region, an accumulated total of the areas of the regions having the transparent specification in this band region (hereinafter, will be referred to as a transparent specification area), and information for distinguishing the edges of the drawing objects existing in this band region (hereinafter, will be referred to as an associated edge ID). The edge information analysis table is stored, for example, in the RAM 222.

FIGS. 16A to 16C respectively illustrate examples of part of the page (region including a plurality of lines). It should be noted that, in FIGS. 16A to 16C, a height (width in a vertical direction in FIGS. 16A to 16C) of each of lines (lines #1 to #5) is 1 pixel. The objects 601 to 603 having the height of 3 pixels having no transparent specification are overlapped with one another in the region illustrated in FIG. 16A. The number of closed regions in the region illustrated in FIG. 16A (hereinafter, will be also referred to as a closed region number) is 23 pieces as illustrated in a middle drawing of FIG. 16A. On the other hand, the height of each of the objects 601 to 603 is 3 pixels, and the height of each of the edges indicating the outlines of the objects is also 3 pixels. Therefore, the accumulated total of the heights of the edges is 23 pixels as illustrated in a right drawing of FIG. 16A. In this manner, the number of closed regions (23 pieces) has a feature of being matched with the accumulated total of the heights of the edges (23 pixels). Therefore, while the accumulated total of the heights of the edges is obtained, it is possible to estimate the number of closed regions. It should be noted that, since the edge of the page left end is an edge that creates a closed region, the height of the edge of the page left end is also added to the accumulated total of the edges according to the present exemplary embodiment. On the other hand, since the edge of the page right end does not create a closed region within a page range, the height thereof is not included in the accumulated total of the heights of the edges. In the right drawing of FIG. 16A, the edge of the page left end and the edge indicating the start of the object are assigned with downward arrows. The edge indicating the end of the object is assigned with an upward arrow. When a size of the vector data corresponding to the processing band is estimated, the number of closed regions in the vector data is provided. For this reason, according to the present exemplary embodiment, the heights of the edges are accumulated to calculate the number of closed regions.

Here, a detail of the edge information analysis processing illustrated in FIG. 14 will be described.

First, the CPU 220 calculates a height of the edge of the drawing object from the intermediate data generated in the processing in step S402 (step S1401). Then, the CPU 220 updates the edge information analysis table with the calculated value. Specifically, the CPU 220 adds the calculated value to the accumulated total of the heights of the edges in the band region where the drawing objects exist.

Next, the CPU 220 determines whether or not the intermediate data generated in step S402 is a bitmap character (step S1402). In a case where the intermediate data is not the bitmap character (step S1402: NO), the CPU 220 shifts to the processing in step S1404.

In a case where the intermediate data is the bitmap character (step S1402: YES), the CPU 220 calculates a height of the edge of the outline of the bitmap character to be added to the accumulated total of the heights of the edges of the drawing objects (step S1403). In a case where the drawing object is the bitmap character, only the outlines of both ends of the bitmap edge (part assigned with outlined arrows in a left drawing of FIG. 16B) are generated as the intermediate data in the processing in step S402. However, the outlines of the character are also extracted in the rendering processing as illustrated in a middle drawing of FIG. 16B, and the rendering processing is performed with respect to 25 pieces of closed regions. In this manner, in a case where the drawing object is the bitmap character, the number of closed regions is 25 in contrast to the accumulated total of the heights of the edges (15 pixels), and therefore the number of closed regions is not matched with the accumulated total of the heights of the edges. That is, in a case where the drawing object is the bitmap character, the number of closed regions is not precisely obtained on the basis of a simply accumulated total of the heights of the edges. In view of the above, according to the present exemplary embodiment, in a case where the drawing object is the bitmap character, the CPU 220 analyzes the bitmap character to extract the edges of the character and calculates the precise number of closed regions. Specifically, the CPU 220 determines a boundary between the bitmap character and another drawing object or a background in each line as the edge of this bitmap character to be extracted. In the example of FIG. 16B, the CPU 220 extracts a region where white and black are reversed in a main scanning direction (part assigned with an outline arrow illustrated in a right drawing of FIG. 16B) as the edge. The CPU 220 adds the accumulated total of the heights of the edges of the extracted bitmap character (10 pixels) to the accumulated total of the heights of the edges of the drawing objects. As a result, the number of closed regions (25 pieces) is equal to the total value of the heights of the edges (15 pixels+10 pixels), and the precise number of closed regions is calculated. It should be noted that a related-art technology may be used for the edge extraction processing.

Next, the CPU 220 determines whether or not the drawing object corresponding to the intermediate data generated in the processing in step S402 has the transparent specification (step S1404). In a case where the drawing object has no transparent specification (step S1404: NO), the CPU 220 shifts to the processing in step S1406.

In a case where the drawing object has the transparent specification (step S1404: YES), the CPU 220 calculates the area of a bounding box of the intermediate data generated in the processing in step S402 and updates the edge information analysis table with the calculated value. Specifically, the CPU 220 adds the calculated value to an accumulated total of the transparent specification areas of the band region where the drawing objects exist (step S1405). The accumulated total of the transparent specification areas is used in calculation processing for a memory size in the block sequence conversion processing based on the vector system which will be described below. For this reason, according to the present exemplary embodiment, the accumulated total of the transparent specification areas is calculated in the above-described manner.

Finally, the CPU 220 associates the band crossed by the edge of the drawing object with the ID of this edge to be registered in the edge information analysis table (step S1406). Specifically, the CPU 220 registers the ID of this edge in the associated edge ID of the band crossed by this edge as a link list. The associated edge ID is used in calculation processing for the object number (processing in step S1803) which will be described below.

Detail of the Block Sequence Conversion Method Selecting Processing

Figure 17:
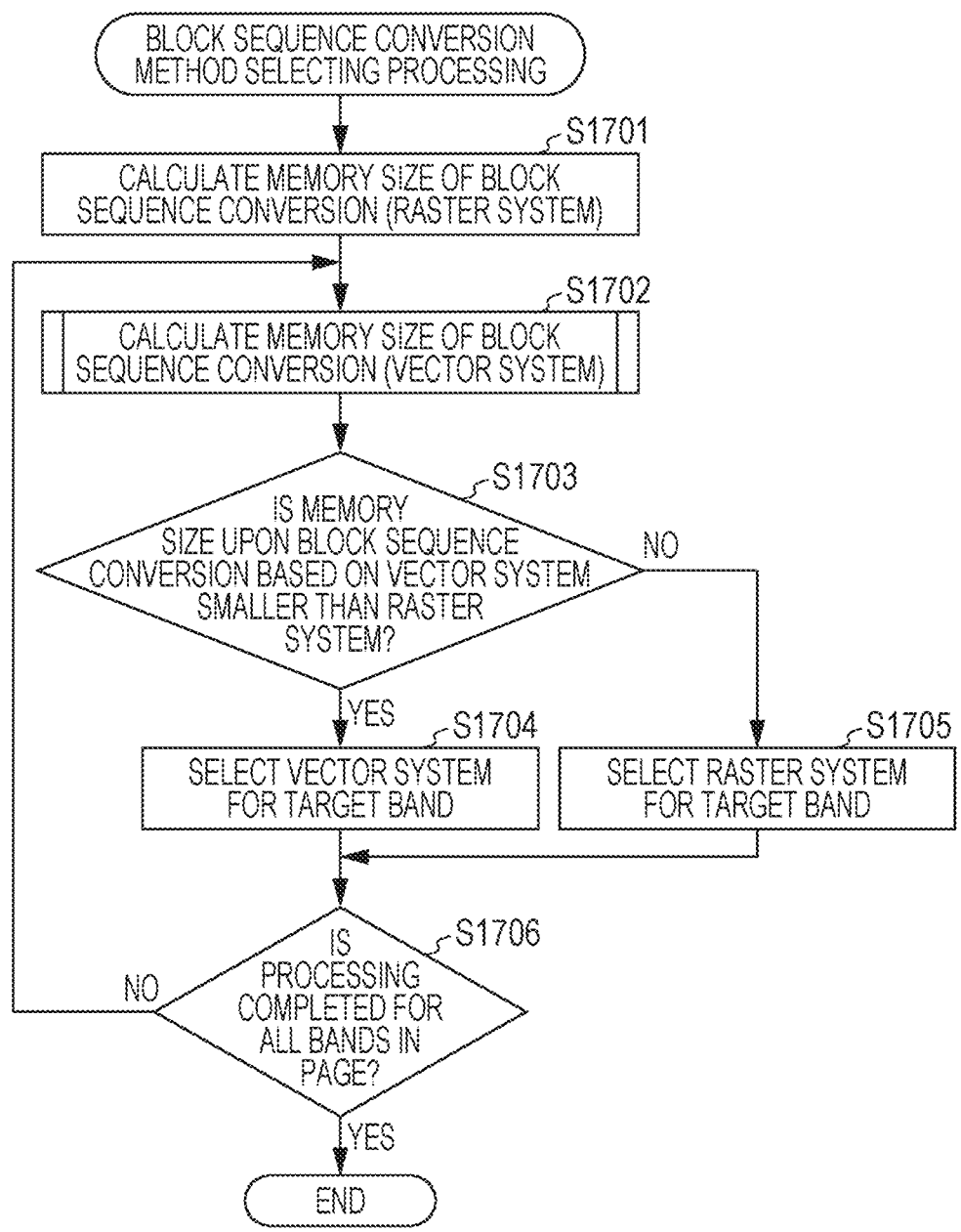
FIG. 17 is a flow chart illustrating block sequence conversion method selecting processing according to the first exemplary embodiment of the present disclosure.

FIG. 17 is a flow chart illustrating the block sequence conversion method selecting processing according to the present exemplary embodiment (processing in step S405).

First, the CPU 220 calculates a band memory (memory size of the raster data for one band) which is used when the raster system is selected as the block sequence conversion method (step S1701). Since the raster data is uniformly obtained from the following expression, the processing is performed at only the initial position of the page.

Band memory used in the block sequence conversion processing based on the raster system=Page width×Height of the band (height of the block)×Gray scale per channel×The number of channels per pixel (1)

Next, the CPU 220 calculates a band memory (memory size of the vector data in the processing band) which is used when the vector system is selected as the block sequence conversion method from the following expression (step S1702).

Band memory used in the block sequence conversion processing based on the vector system=Size total of the closed region data
included in the band+Size total of the object
data in the closed region included in the band  (2)

The size total of the closed region data included in the band and the size total of the object data in the closed region included in the band in Expression 2 are calculated from Expression 3 and Expression 4 described below.

Next, the CPU 220 compares a magnitude relationship of the memory sizes derived from the processing in step S1701 and the processing in step S1702 and determines whether or not the block sequence conversion is performed by using a smaller memory consumption on the basis of the vector system than the raster system (step S1703).

In a case where the memory consumption is smaller on the basis of the vector system than the raster system (step S1703: YES), the CPU 220 selects the vector system as the block sequence conversion method in the processing band (step S1704). Specifically, the CPU 220 specifies the vector system as the block sequence conversion method in this band of the block sequence conversion method table used in the rendering processing (processing in step S303).

In a case where the memory consumption is not smaller on the basis of the vector system than the raster system (step S1703: NO), the CPU 220 selects the raster system as the block sequence conversion method in the processing band (step S1705). Specifically, the CPU 220 specifies the raster system as the block sequence conversion method in this band of the block sequence conversion method table used in the rendering processing (processing in step S303).

Next, the CPU 220 determines whether or not the processing is ended for all the bands in the page (step S1706). In a case where the processing is not ended (step S1706: NO), the CPU 220 returns to the processing in step S1702. In a case where the processing is ended (step S1706: YES), the CPU 220 ends the processing.

Figure 18:
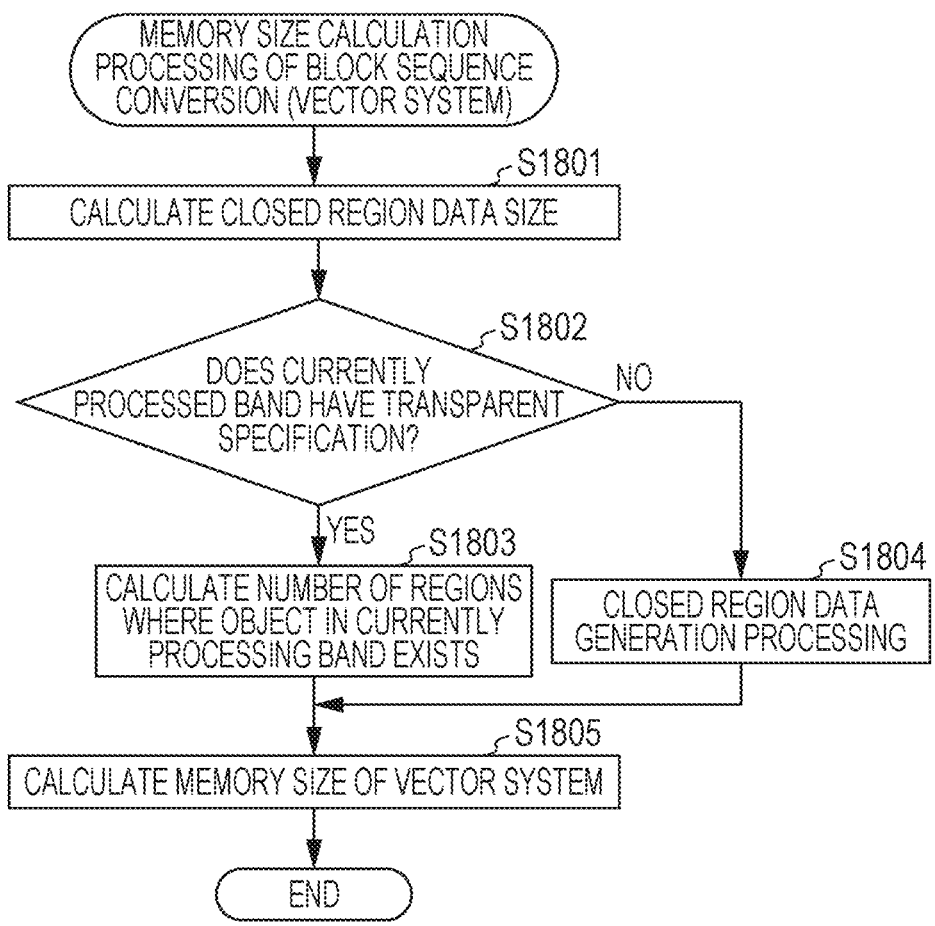
FIG. 18 is a flow chart illustrating memory size calculation processing in block sequence conversion processing based on a vector system according to the first exemplary embodiment of the present disclosure.

Detail of Memory Size Calculation Processing at the Time of the Block Sequence Conversion Processing Based on the Vector System FIG. 18 is a flow chart illustrating memory size calculation processing in the block sequence conversion processing (processing in step S1702) based on the vector system according to the present exemplary embodiment.

First, the CPU 220 calculates a size total of the closed region data included in the processing band (step S1801). The size total of the closed region data included in the processing band is calculated from the following expression.

Size total of the closed region data included in the
band=The number of closed regions included in
the band×Size per data piece of the closed
region data  (3)

As described above, since the number of closed regions is matched with the accumulated total of the heights of the edges, the accumulated total of the heights of the edges is used as the number of closed regions included in the band in Expression 3. At this time, the CPU 220 obtains the accumulated total of the heights of the edges corresponding to the processing band from the edge information analysis table.

The size per data piece of the closed region data is a uniquely determined value. For example, in a case where this size is 8 bytes and the processing band corresponds to the band region #1 in the edge information analysis table illustrated in FIG. 15, the size per data piece of the closed region data in this processing band is calculated as 32×8=256 bytes.

Next, the CPU 220 determines whether or not the drawing object having the transparent specification exists in the processing band (step S1802). Herein, the CPU 220 obtains an accumulated total of the transparent specification areas in this band from the edge information analysis table and determines whether or not the obtained value is lower than or equal to a previously set predetermined threshold (for example, Th0=0).

In a case where the accumulated total of the transparent specification areas is higher than the threshold (step S1802: YES), the CPU 220 determines that the drawing object having the transparent specification exists in the processing band. Then, the CPU 220 shifts to the processing in step S1803 which will be described below.

In a case where the accumulated total of the transparent specification areas is lower than or equal to the threshold (step S1802: NO), the CPU 220 determines that the drawing object having the transparent specification does not exist, and the number of overlapped drawing objects in all the closed regions in the processing band is lower than two. That is, the CPU 220 determines that the drawing objects in the processing band are not overlapped with one another. Then, the CPU 220 performs the generation processing of the actual closed region data with respect to the processing band on the basis of the intermediate data generated in the processing in step S302 (step S1804). At this time, the CPU 220 extracts the edge information indicating the outline of the drawing object included in the processing band from the intermediate data. Then, the CPU 220 performs the generation processing of the closed region data in the processing band on the basis of the position information of the edge included in the edge information and the detailed information of the outline, and furthermore the object information associated with the outline and the information indicating how the objects are overlapped with one another. It should be noted however that the processing in step S1804 is executed only in a case where the drawing object having the transparent specification does not exist, and therefore the processing related to the overlapping where the transparent specification is taken into account is not performed in the processing in step S1804. In this manner, the more simplified generation processing of the closed region data is performed in the processing in step S1804 as compared with the processing in step S501 described above. As a result, the number of drawing objects can be obtained by adding the numbers of objects of the respective pieces of actually generated closed region data to one another. It should be noted that a related-art technology is used with regard to the generation processing of the closed region data.

Here, the processing in step S1803 will be described. In a case where the drawing object having the transparent specification exists in the processing band, the overlapping of the drawing objects is to be taken into account. For this reason, when the closed region data is actually generated similarly as in the processing in step S1804, processing load may be increased in some cases. In view of the above, the CPU 220 calculates the number of drawing objects in the processing band in the processing in step S1803 in the following manner. First, as illustrated in a middle drawing in FIG. 16C, the CPU 220 holds information indicating whether each edge in the processing band is an edge indicating start or end of the drawing object as a table. The middle drawing in FIG. 16C indicates whether edges 1651 to 1657 illustrated in a left drawing in FIG. 16C are edges indicating the start or end of the drawing object. It should be noted that the edges 1651 to 1657 are respectively assigned with edge IDs 0 to 6. The CPU 220 obtains information stored while being associated with the associated edge ID in the processing band from the table illustrated in the middle drawing in FIG. 16C. Then, the CPU 220 determines whether or not each edge in the processing band is the edge indicating the start of the drawing object or the edge indicating the end of the drawing object from the obtained information. Subsequently, as illustrated in a right drawing of FIG. 16C, the CPU 220 scans the line in the processing band to calculate the number of drawing objects. Specifically, when the edge indicating the start of the drawing object is detected, the CPU 220 adds 1 to the number of drawing objects. On the other hand, when the edge indicating the end of the drawing object is detected, the CPU 220 subtracts 1 from the number of drawing objects. The CPU 220 repeatedly performs this processing for the number of the heights of the band, so that the number of drawing objects in the processing band is calculated. It should be noted that the threshold (Th0 described above) used for determining whether or not the drawing object having the transparent specification exists may be arbitrarily specified by a user.

The CPU 220 calculates the size total of the object data in the closed regions included in the processing band on the basis of the total of the numbers of objects in the closed regions included in the processing band obtained in the processing in step S1803 or S1804 by using the following expression.

Size total of the object data in the closed regions included in the band=Total of the numbers of objects in the closed regions included in the band×Size per data piece of the object data included in the closed regions (4)

Finally, the CPU 220 assigns the values calculated by Expression 3 and Expression 4 to Expression 2 and calculates a memory size of the vector system (step S1805).

As described above, according to the first exemplary embodiment, a memory size used in the block sequence conversion processing based on the vector system and a memory size used in the block sequence conversion processing based on the raster system are compared with each other to select the block sequence conversion method using the still smaller memory consumption. As a result, irrespective of a content of the page image data corresponding to the target of the rendering processing, it is possible to perform the block sequence conversion processing at an optimal buffer memory size. For example, in a case where the page image data includes a large number of the drawing objects and the size of the vector data may increase, since the block sequence conversion method based on the raster system is selected, it is possible to suppress the memory consumption at the time of the block conversion processing. In this manner, according to the present exemplary embodiment, the optimal block sequence conversion method can be selected in the block sequence conversion processing, and it is possible to perform the block sequence conversion processing by using the still smaller buffer memory size.

In addition, according to the present exemplary embodiment, when the number of drawing objects in the processing band is calculated, in a case where in the drawing object having the transparent specification exists in the processing band (a case where it is determined as YES in step S1802), the number of objects is calculated on the basis of the detection results of the edges indicating the start and end of the drawing objects. Therefore, it is possible to further reduce the processing load when the memory size used at the time of the block sequence conversion processing based on the vector system is derived. It should be noted that, in a case where the drawing object having the transparent specification does not exist in the processing band (a case where it is determined as NO in step S1802), the flow may shift to the processing in step S1803 where the closed region data is not generated without shifting to the processing in step S1804. According to the above-described exemplary embodiment, it is possible to further reduce the processing load when the memory size used at the time of the block sequence conversion processing based on the vector system is derived.

Second Exemplary Embodiment

According to the first exemplary embodiment, the image processing apparatus that performs the edge information analysis processing and the block sequence conversion method selecting processing corresponding to the features of the present exemplary embodiment in the intermediate data generation processing (processing in step S302) is used as an example. According to the present exemplary embodiment, the image processing apparatus that performs the edge information analysis processing and the block sequence conversion method selecting processing corresponding to the features of the present exemplary embodiment in the rendering processing (processing in step S303) will be used as an example. It should be noted that, since a hardware configuration and a software configuration of the image processing apparatus according to the present exemplary embodiment are similar to those of the image processing apparatus 110 according to the first exemplary embodiment, the descriptions thereof will be omitted.

Printing Processing of the Transferred PDL in the Image Processing Apparatus

Figure 19:
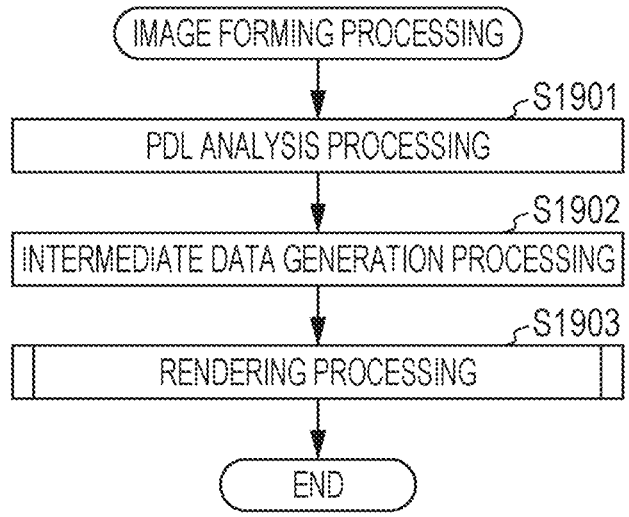
FIG. 19 is a flow chart illustrating image forming processing of the image processing apparatus according to a second exemplary embodiment of the present disclosure.

FIG. 19 is a flow chart illustrating the image forming processing of the image processing apparatus according to the present exemplary embodiment. FIG. 19 illustrates a series of flows of the printing processing on the PDL data of the image processing apparatus 110 according to the present exemplary embodiment. The processing illustrated in FIG. 19 is executed by the CPU 220. Specifically, the CPU 220 loads a program for executing the processing illustrated in FIG. 19 from the ROM 221 into the RAM 222 to be executed, so that the processing illustrated in FIG. 19 is executed. It should be noted that a configuration may also be adopted in which a CPU, a ROM, and a RAM of the external apparatus (for example, the printer server 103) execute the processing illustrated in FIG. 19 instead of the CPU 220, the ROM 221, and the RAM 222 of the image processing apparatus 110.

First, the PDL data is transmitted from the host computer 101, the mobile terminal 102, or the printer server 103 to the image processing apparatus 110. Subsequently, the CPU 220 of the image processing apparatus 110 stores the received PDL data in the storage device 223.

Next, the CPU 220 obtains the PDL data stored in the storage device 223 and performs analysis processing of the obtained PDL data (step S1901).

Next, the CPU 220 performs generation processing for the intermediate data used to generate the bitmap image data on the basis of the analyzed information of the PDL data (step S1902). In the processing in step S1902, intermediate data generation processing based on a related-art technology is performed.

Next, the CPU 220 performs the edge information analysis processing and the block sequence conversion method selecting processing corresponding to the features of the present exemplary embodiment. Furthermore, the CPU 220 performs the rendering processing accompanied by the block sequence conversion processing in accordance with the generated intermediate data and the selected block sequence conversion method selecting processing and generates the bitmap image data representing the page image (step S1903). It should be noted that the generated bitmap image data is the block image data where the page image is set in the block sequence, and subsequent image processing is applied to this block image data in units of block.

Detail of the Rendering Processing

Figure 20:
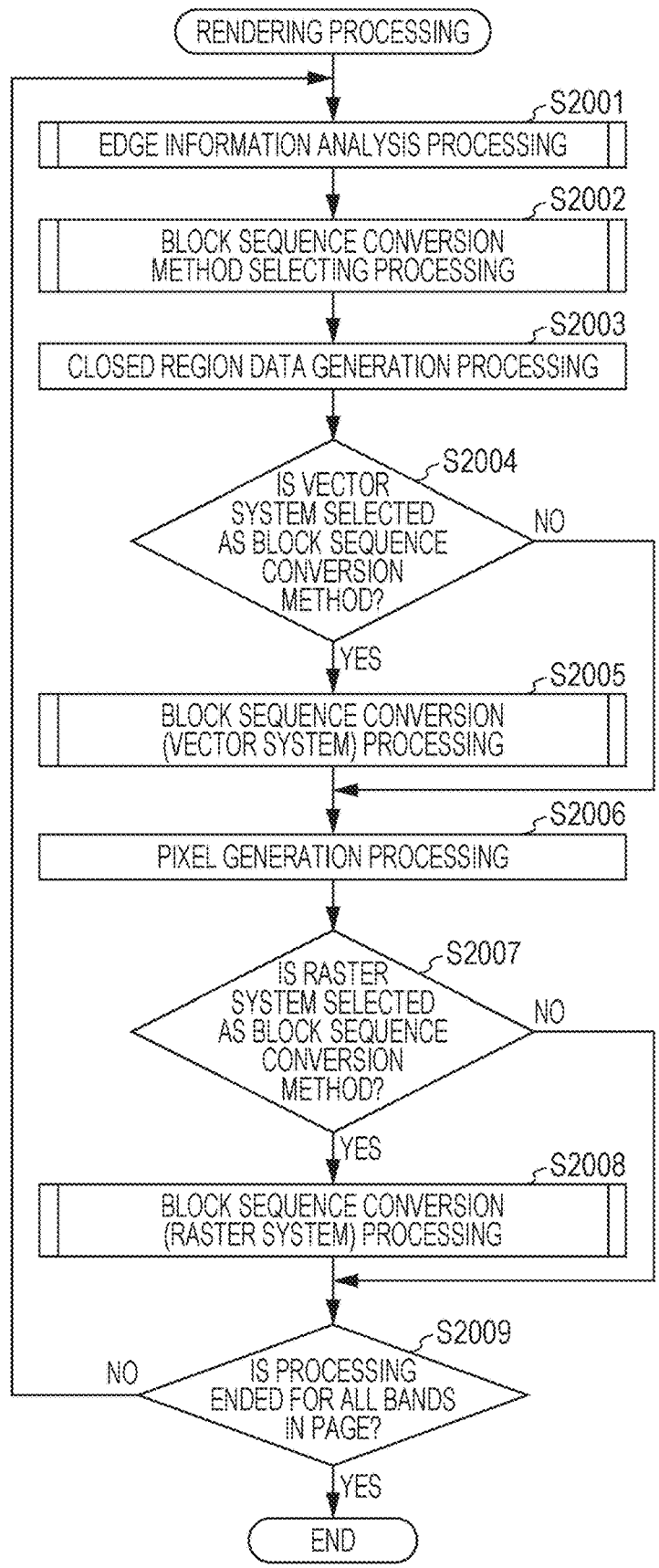
FIG. 20 is a flow chart illustrating the rendering processing according to the second exemplary embodiment of the present disclosure.

FIG. 20 is a flow chart illustrating the rendering processing according to the present exemplary embodiment (processing in step S1903). FIG. 21 is a flow chart illustrating the edge information analysis processing according to the second exemplary embodiment of the present disclosure. The rendering processing according to the present exemplary embodiment includes the edge information analysis processing, the block sequence conversion method selecting processing, and the block sequence conversion processing corresponding to the features of the present exemplary embodiment.

First, the CPU 220 extracts information from the edge information included in the intermediate data generated in step S1902 which is used for selecting whether to perform the block sequence conversion processing on the basis of the vector data or perform the block sequence conversion processing on the basis of the raster data (step S2001). Here, a detail of the processing in step S2001 will be described. FIG. 21 is a flow chart illustrating the edge information analysis processing according to the second exemplary embodiment of the present disclosure (processing in step S2001). As illustrated in FIG. 21, the CPU 220 generates the closed region data with regard to a previously set predetermined number of lines (step S2101). It should be noted that the predetermined number mentioned herein is a value lower than or equal to the number of all lines in the band. That is, the predetermined number of lines refers to all or part of lines in the processing band. At this time, the CPU 220 extracts the edge information indicating the outline of the drawing object included in the predetermined number of lines in the processing band from the intermediate data. Then, the CPU 220 performs the generation processing of the closed region data with regard to the predetermined number of lines in the processing band on the basis of position information of the edge included in the edge information and detailed information of the outline. It should be noted that, in the generation processing of the closed region data in step S2101, object information associated with the outline and information indicating how the objects are overlapped with one another are further used in addition to the position information of the edge included in the edge information and the detailed information of the outline. Therefore, in the generation processing of the closed region data in step S2101, similarly as in the above-described processing in step S501, the generation processing of the closed region data in which the overlapping of the objects is taken into account is performed. As a result, the numbers of object of the respective pieces of actually generated closed region data are added to one another so that the number of drawing objects can be obtained irrespective of the presence or absence of the transparent specification. It should be noted that a related-art technology is used with regard to the generation processing of the closed region data. As a result, a configuration is adopted in which the size of the closed region data of the predetermined number of lines calculated in the above-described processing is used, and this is utilized in the subsequent block sequence conversion method selecting processing (processing in step S2002).

Next, the CPU 220 performs the block sequence conversion method selecting processing performed in the rendering processing (processing in step S1903) on the basis of the information used for the block sequence conversion method selecting processing obtained in step S2001 (step S2002). Specifically, the CPU 220 determines one of the vector system and the raster system to perform the block sequence conversion by using a smaller memory. The CPU 220 selects one of the vector system and the raster system as the block sequence conversion method on the basis of the determination result. The detail of the block sequence conversion method selecting processing will be described below.

Next, the CPU 220 performs the generation processing of the closed region data corresponding to the vector data dealt in the rendering processing (step S2003). Since the generated closed region data is equivalent to the content illustrated in FIGS. 9A and 9B to FIGS. 12A and 12B, the descriptions thereof will be omitted.

Next, the CPU 220 refers to the block sequence conversion table and determines whether or not the block sequence conversion method corresponding to the processing band is the vector system (step S2004).

In a case where the block sequence conversion method is not the vector system (step S2004: NO), the CPU 220 shifts to the processing in step S2006.

In a case where the block sequence conversion method is the vector system (step S2004: YES), the CPU 220 temporarily stores the vector data corresponding to the processing band generated in the processing in step S2003 in the block sequence conversion memory 210. Then, the CPU 220 converts the vector data stored in the block sequence conversion memory 210 into the block sequence (step S2005). Since the processing in step S2005 is equivalent to the processing in step S503 described above, the descriptions thereof will be omitted.

Next, the CPU 220 performs the generation processing of the raster data on the basis of the vector data (step S2006). It should be noted that, in a case where the block sequence conversion method is the vector system, the vector data is converted into the block sequence in the processing in step S2005. Thus, the raster data generated in the processing in step S2006 is also generated in the block sequence. On the other hand, in a case where the block sequence conversion method is the raster system, the processing in step S2005 is not executed. Thus, the raster data generated in the processing in step S2006 is generated in the line sequence.

Next, the CPU 220 performs processing of referring to the block sequence conversion method table and determining whether or not the block sequence conversion method corresponding to the processing band is the raster system (step S2007).

In a case where the block sequence conversion method is not the raster system (step S2007: NO), the CPU 220 shifts to the processing in step S2009.

In a case where the block sequence conversion method is the raster system (step S2007: YES), the CPU 220 generates the raster data that has been generated in the line sequence in step S2006 in the block sequence (step S2008). At this time, first, the CPU 220 temporarily stores the pixel data corresponding to the processing band generated in the processing in step S2006 in the block sequence conversion memory 210. Then, the CPU 220 converts the raster data stored in the block sequence conversion memory 210 from the line sequence into the block sequence. Since the processing in step S2008 is equivalent to the processing in step S506 described above, the descriptions thereof will be omitted.

Next, the CPU 220 determines whether or not the processing is ended for all the bands included in the page image data (step S2009). When it is determined that the processing is not ended (step S2009: NO), the CPU 220 returns to the processing in step S2001. When it is determined that the processing is ended (step S2009: YES), the CPU 220 ends the processing.

Detail of the Block Sequence Conversion Method Selecting Processing

FIG. 22 is a flow chart illustrating the block sequence conversion method selecting processing according to the second exemplary embodiment of the present disclosure (processing in step S2002).

First, the CPU 220 calculates the memory size of the raster data for the predetermined number of lines when the raster system is selected as the block sequence conversion method (step S2201). Since the raster data is uniformly obtained from the following expression, the processing is performed at only the initial position of the page.

$$\text{Memory for the predetermined number of line used in the block sequence conversion processing based on the raster system} = \text{Page width} \times \text{Height of the predetermined number of lines} \times \text{Gray scale per channel} \times \text{The number of channels per pixel} \quad (5)$$

Next, the CPU 220 calculates the memory size of the vector data for the predetermined number of lines which is used when the vector system is selected as the block sequence conversion method (step S2202). In actuality, the CPU 220 obtains the data size of the closed region data in the predetermined band generated in the processing in step S2101.

Next, the CPU 220 compares a magnitude relationship of the memory sizes derived from the processing in step S2201 and the processing in step S2202 and determines whether or not the block sequence conversion is performed by using a smaller memory consumption on the basis of the vector system than the raster system (step S2203).

In a case where the memory consumption is smaller on the basis of the vector system than the raster system (step S2203: YES), the flow proceeds to step S2204. In a case where the raster system uses the smaller memory consumption, the flow proceeds to step S2205.

In a case where the memory consumption is smaller on the basis of the vector system than the raster system (step S2203: YES), the CPU 220 selects the vector system as the block sequence conversion method in the processing band (step S2204).

In a case where the memory consumption is not smaller on the basis of the vector system than the raster system (step S2203: NO), the CPU 220 selects the raster system as the block sequence conversion method in the processing band (step S2205).

Next, the CPU 220 performs processing of determining whether or not the processing is ended for all the bands in the page (step S2206). In a case where the processing is not ended (step S2206: NO), the CPU 220 returns to the processing in step S2202. In a case where the processing is ended (step S2206: YES), the CPU 220 ends the processing.

As described above, the image processing apparatus according to the present exemplary embodiment determines the block sequence conversion processing system optimal in units of band by generating the closed region data for the predetermined number of lines. Specifically, the memory size of the vector data and the memory size of the vector data for the predetermined number of lines in the processing band are compared with each other to select the block sequence conversion method in this processing band. According to the above-described exemplary embodiment, since it is sufficient when the closed region data is generated for part of the lines instead of all of the lines in in the processing band in the processing in step S2101, it is possible to further reduce the processing load. It should be noted that, according to the first exemplary embodiment too, the memory size of the vector data and the memory size of the vector data for the predetermined number of lines in the processing band may be compared with each other, and the block sequence conversion method in this processing band may be selected. To realize the above-described exemplary embodiment, for example, it is sufficient when the processing targets in the processing in steps S1701, S1702, and S1804 are set as part of the lines instead of all of the lines in the band.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the aspect of the embodiments has been described with reference to exemplary embodiments, it is to be understood that the aspect of the embodiments is not limited to the disclosed exemplary embodiments. The scope of the following claims is to be accorded the broadest interpretation so as to encompass all such modifications and equivalent structures and functions.

What is claimed is:

1. A method for generating raster data of units of block, the method comprising:

deriving a first data size of data of one or more lines included in a band in a predetermined data format, which is a different format from a raster data format, wherein the first data size is derived at least based on transparent information of one or more objects in the band in the predetermined data format in a case where one or more transparent objects are included in the band;

converting, if the obtained first data size is not greater than a second data size, data of the band in the predetermined data format into data of blocks in the predetermined data format;

rasterizing the data of blocks in the predetermined data format into raster data of the blocks;

rasterizing, if the obtained first data size is greater than the second data size, data of the band in the predetermined data format into raster data of the band; and converting the raster data of the band into raster data of blocks, wherein the second data size is determined based on size of the band.

2. The method according to claim 1, wherein the second data size is determined based on a page width.

3. The method according to claim 1, wherein the first data size is determined based on whether or not one or more object having a transparent specification exists in the band in the predetermined data format.

4. The method according to claim 1, wherein the second data size is determined based on data size of raster data of the band.

5. An information processing apparatus for generating raster data of units of block, the information processing apparatus comprising:

one or more processors configured to function as:

a deriving unit configured to derive a first data size of data of one or more lines included in a band in a predetermined data format, which is a different format from a raster data format, wherein the first data size is derived at least based on transparent information of one or more objects in the band in the predetermined data format in a case where one or more transparent objects are included in the band:

a first converting unit configured to convert, if the obtained first data size is not greater than a second data size, data of the band in the predetermined data format into data of blocks in the predetermined data format;

a first rasterizing unit configured to rasterize the data of blocks in the predetermined data format into raster data of the blocks;

a second rasterizing unit configured to rasterize, if the obtained first data size is greater than the second data size, data of the band in the predetermined data format into raster data of the bands; and a second converting unit configured to convert the raster data of the band into raster data of blocks, wherein the second data size is determined based on size of the band.

6. The information processing apparatus according to claim 5, wherein the second data size is determined based on a page width.

7. The information processing apparatus according to claim 5, wherein the first data size is determined based on whether or not one or more object having a transparent specification exists in the band in the predetermined data format.

8. The information processing apparatus according to claim 5, wherein the second data size is determined based on data size of raster data of the band.

9. A non-transitory computer readable storage medium storing a program of instruction for causing a computer to perform a method for generating raster data of units of block, the method comprising:

deriving a first data size of data of one or more lines included in a band in a predetermined data format, which is a different format from a raster data format, wherein the first data size is derived at least based on transparent information of one or more objects in the band in the predetermined data format in a case where one or more transparent objects are included in the band;

converting, if the obtained first data size is not greater than a second data size, data of the band in the predetermined data format into data of blocks in the predetermined data format;

rasterizing the data of blocks in the predetermined data format into raster data of the blocks;

rasterizing, if the obtained first data size is greater than the second data size, data of the band in the predetermined data format into raster data of the band; and converting the raster data of the band into raster data of blocks, wherein the second data size is determined based on size of the band.

10. The non-transitory computer readable storage medium according to claim 9, wherein the second data size is determined based on a page width.

11. The non-transitory computer readable storage medium according to claim 9, wherein the first data size is determined based on whether or not one or more object having a transparent specification exists in the band in the predetermined data format.

12. The non-transitory computer readable storage medium according to claim 9, wherein the second data size is determined based on data size of raster data of the band.

* * * * *